United States Patent [19]
Schwabe et al.

[11] Patent Number: 5,818,711
[45] Date of Patent: Oct. 6, 1998

[54] METHOD FOR VISUALLY DETERMINING THE STATUS OF PROGRAM EDITS IN AN ON-LINE PROGRAMMING ENVIRONMENT

[75] Inventors: Judith E. Schwabe, Cleveland Heights; Shelly L. Urdaneta, Lyndhurst, both of Ohio

[73] Assignee: Allen Bradley Company, LLC, Milwaukee, Wis.

[21] Appl. No.: 724,099

[22] Filed: Sep. 30, 1996

[51] Int. Cl.$^6$ .................................................. G05B 11/01
[52] U.S. Cl. ........................ 364/147; 364/141; 364/144; 364/140.1; 364/191; 345/683; 395/200.03; 395/200.04; 395/200.06
[58] Field of Search .................................... 364/147, 191, 364/140, 141, 146, 144, 140.01, 140.02; 395/161, 153, 180, 375, 700, 683, 200.03, 200.04, 200.06; 371/19, 29.1, 16, 29; 345/967; 707/526–530

[56] References Cited

U.S. PATENT DOCUMENTS

| | | | |
|---|---|---|---|
| 4,200,915 | 4/1980 | Struger et al. | 364/900 |
| 4,872,167 | 10/1989 | Maezawa et al. | 371/19 |
| 5,247,663 | 9/1993 | Busboom et al. | 395/600 |
| 5,287,548 | 2/1994 | Flood et al. | 395/375 |
| 5,446,838 | 8/1995 | Kimelman | 395/161 |
| 5,485,620 | 1/1996 | Sadre et al. | 395/700 |
| 5,623,401 | 4/1997 | Baxter | 364/147 |

*Primary Examiner*—Paul P. Gordon
*Assistant Examiner*—Ramesh Patel
*Attorney, Agent, or Firm*—John M. Miller; William R. Walbrun; John J. Horn

[57] ABSTRACT

A method for visually displaying the status of edits utilizes a plurality of visual indicia proximal the portions of edited program segments. Program segments which have not been edited and are currently part of the executable program in the programmable logic controller's processor are represented with solid power rails. Edited rungs which have either been inserted, replaced or deleted are noted as such by I, R and D indicia proximal the power rail of the rung. An asterisk symbol (*) is used to visually identify rungs that have been modified at the workstation but which have not yet been downloaded to the controller. Other visual indicia identify to a workstation operator rungs which have been verified. When the controller is put into test edits mode, the state of the program in the controller prior to downloading the edited program segments is maintained but is not executed and the edits are resolved into the program executing in the processor. Inserted program segments are visually represented as a solid line indicating they are currently part of the program being executed in the controller. Replaced and deleted program segments are visually represented in dotted lines as they are no longer part of the program being executed in the remote processor. In the event the operator deletes a program segment which has been downloaded to the controller, the program segment is visually represented with small d indicia which informs the operator that rung will be deleted at the next download.

14 Claims, 21 Drawing Sheets

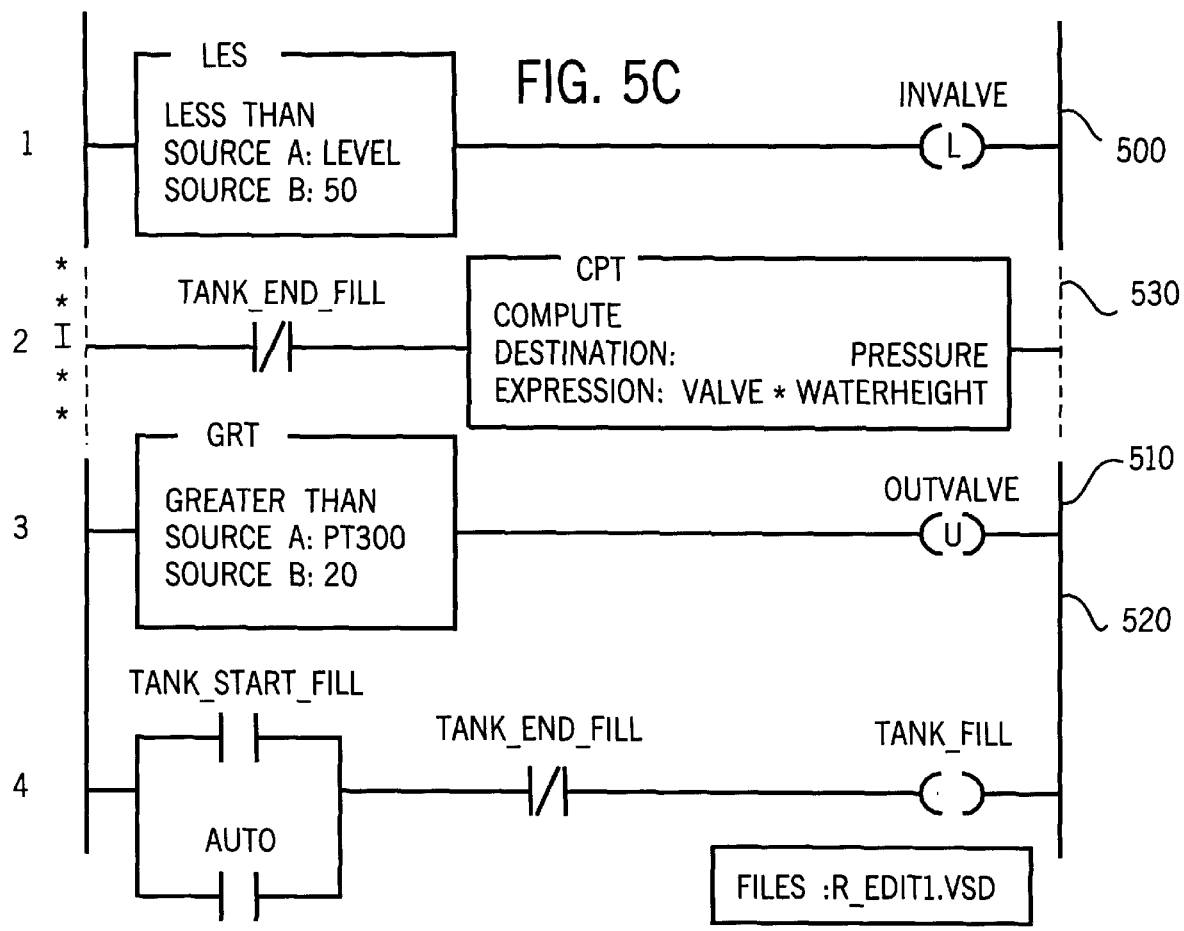

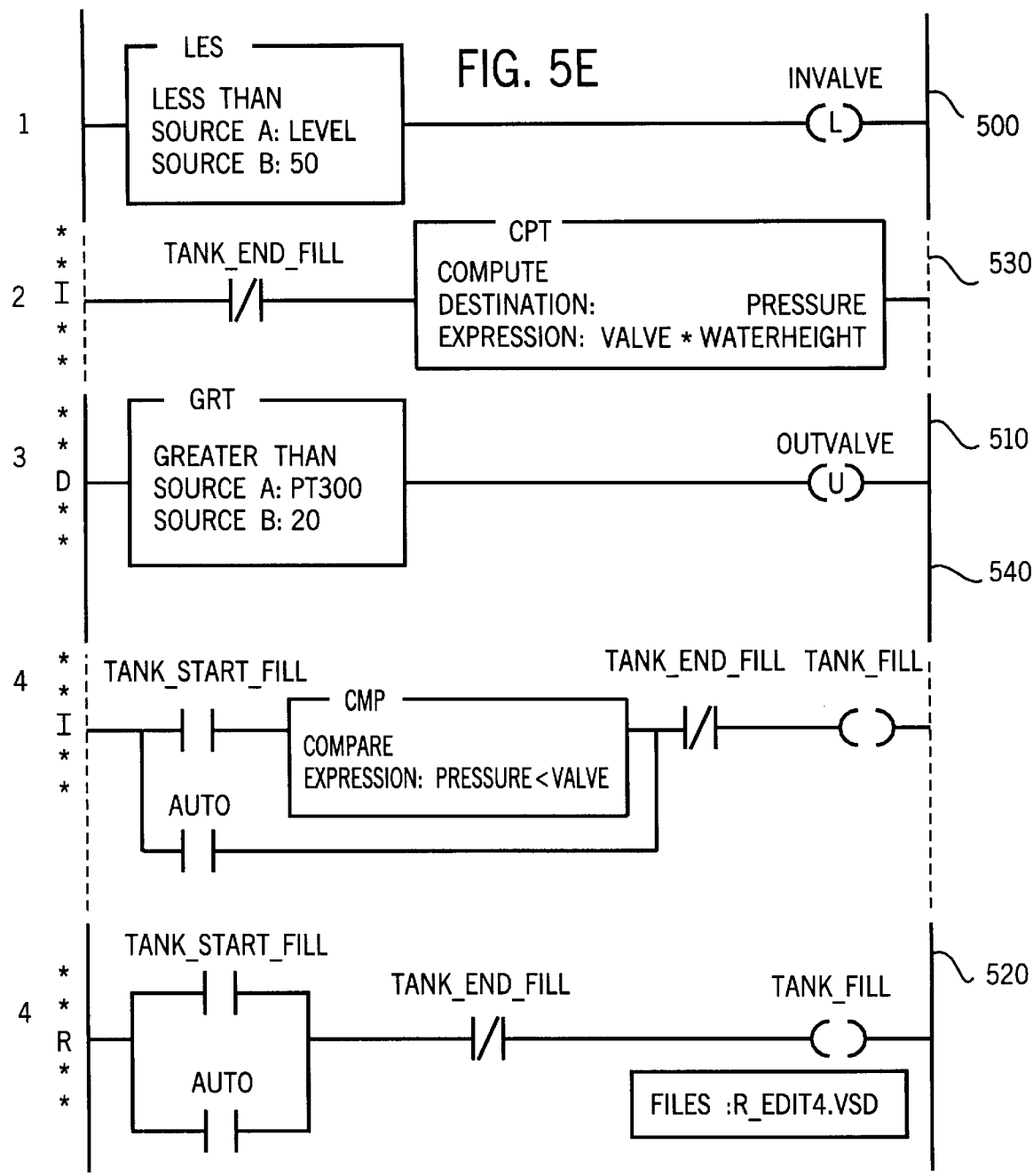

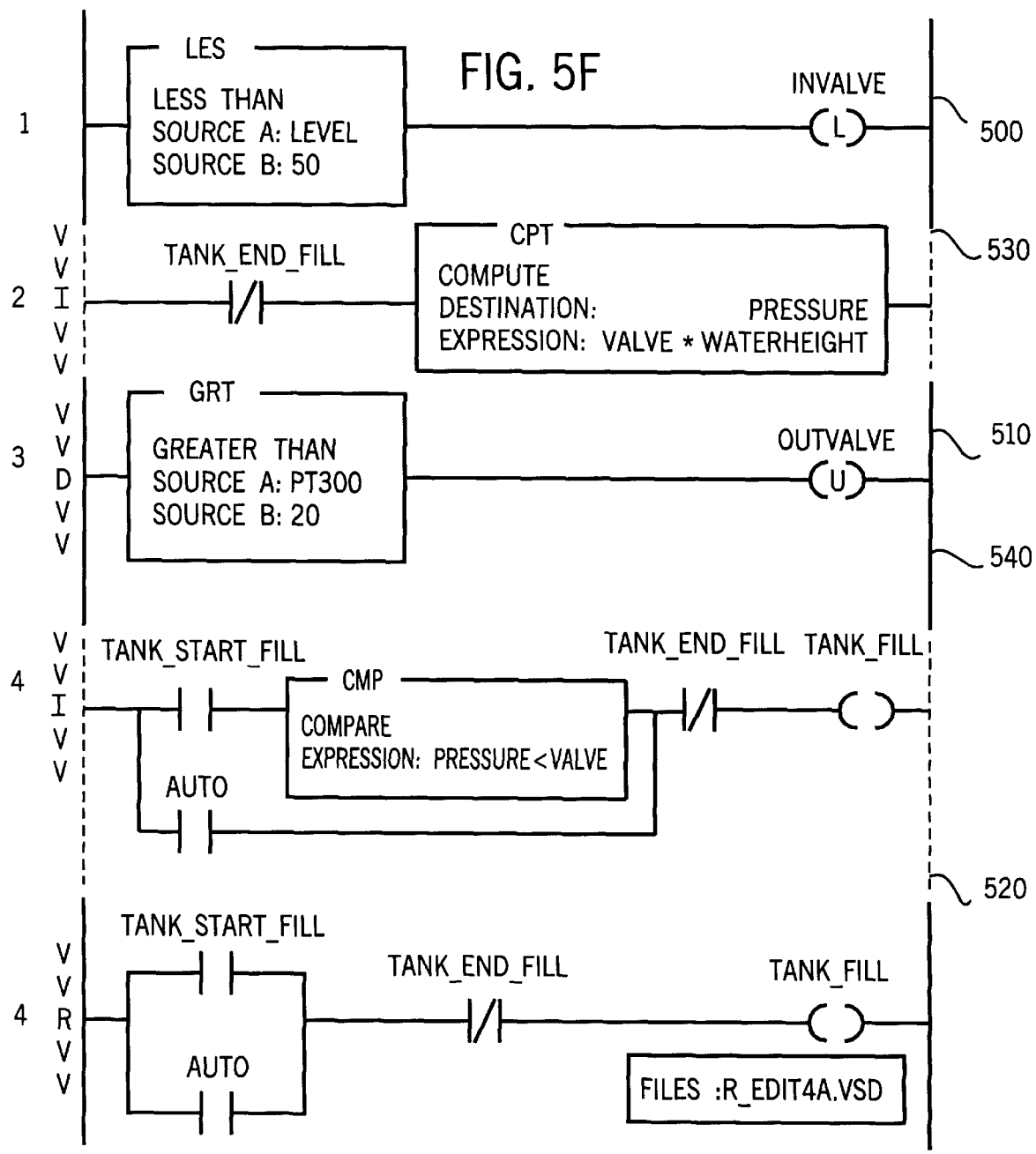

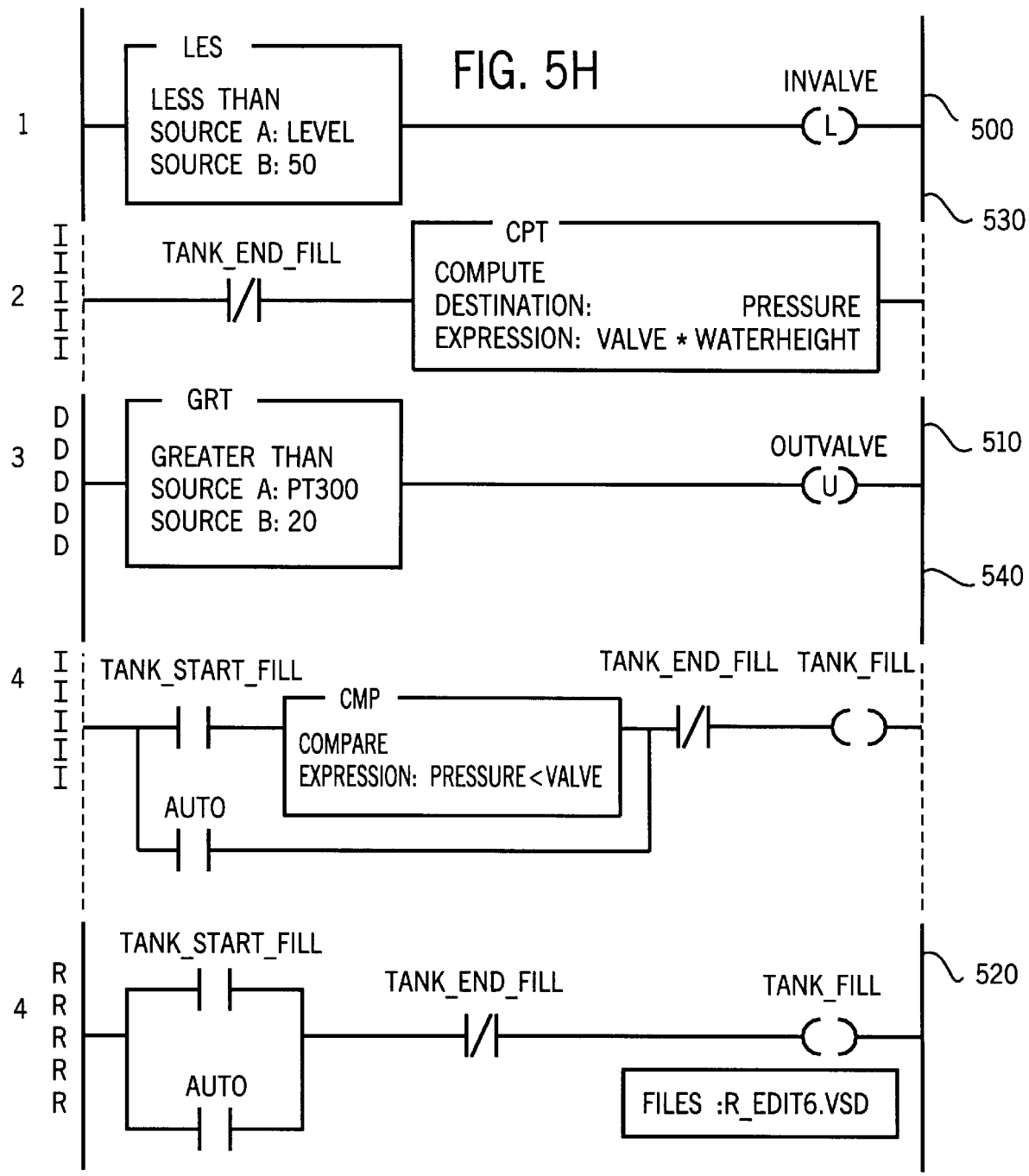

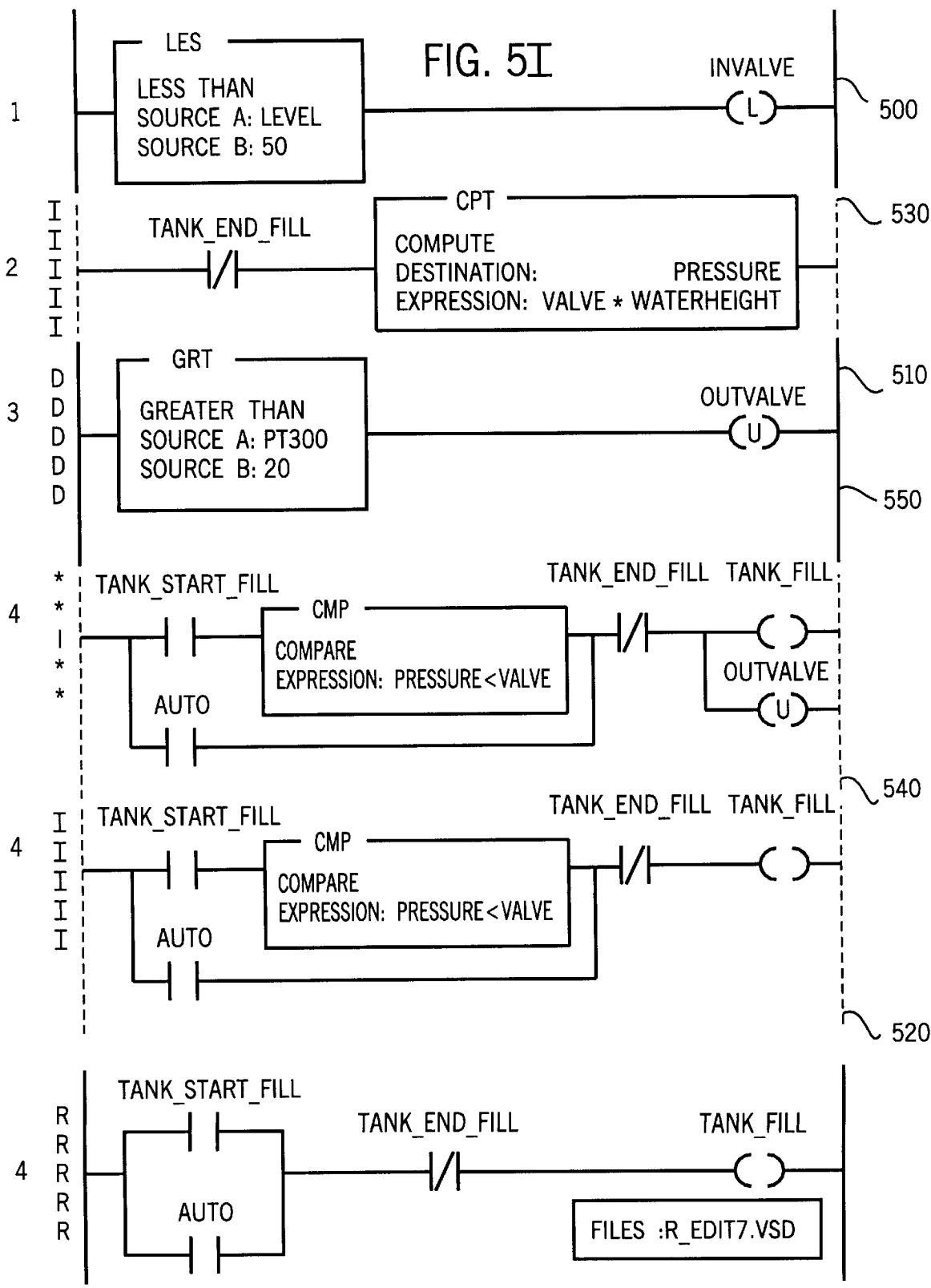

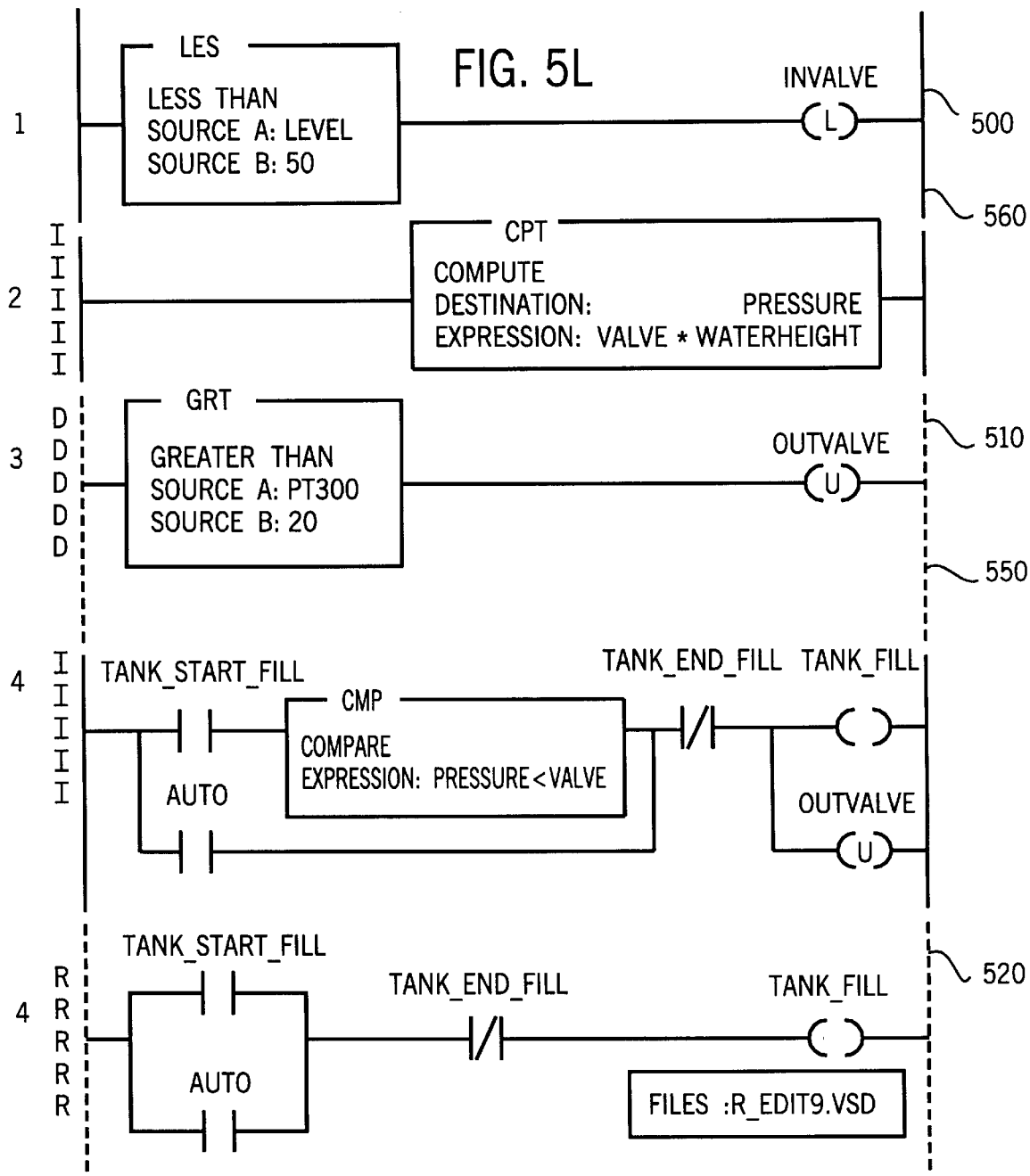

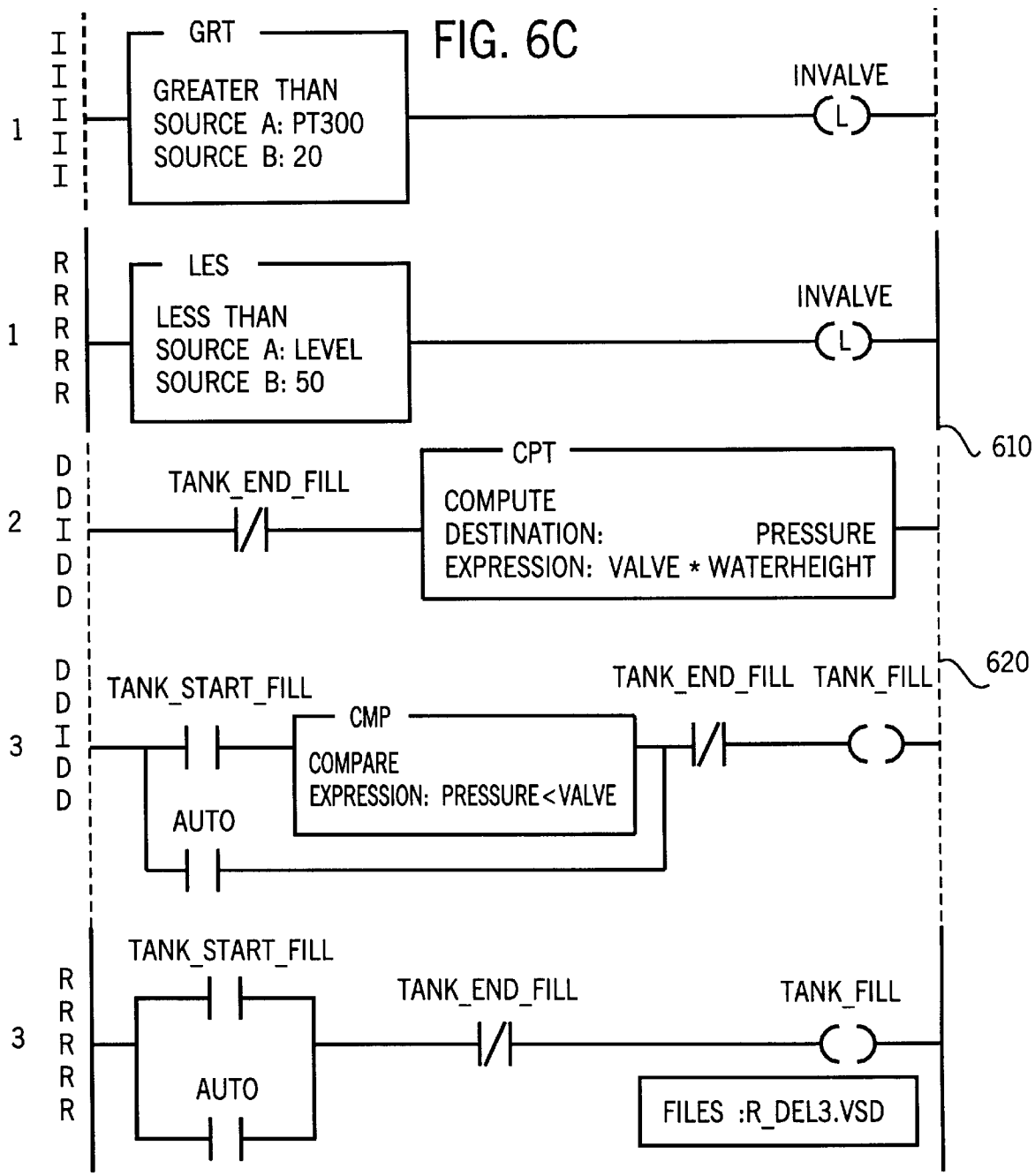

5,818,711

METHOD FOR VISUALLY DETERMINING THE STATUS OF PROGRAM EDITS IN AN ON-LINE PROGRAMMING ENVIRONMENT

FIELD OF INVENTION

This invention relates to visually displaying a plurality of program edits to an operator and more particularly, this invention relates to the simultaneous visual display of the status of a plurality of program edits at a workstation and at a remote processor.

BACKGROUND OF THE INVENTION

In a factory automation setting, a programmable logic controller executes a predefined program to control a plurality of devices on a factory floor in a predetermined manner. The predefined program is typically created at a remote workstation and subsequently downloaded via a communications network to the programmable logic controller for execution by its processor. At times it is desirable to change certain of the program segments to increase system performance or otherwise change the manner in which the programmable logic controller drives the plurality of devices. In particular, segments of the program code may be edited by an operator at a workstation. Subsequently, those program segments are compiled and downloaded to the controller. Depending on the mode of the controller, the downloaded edits may be tested by the controller wherein the ability to remove the edits is permitted or the edits are immediately integrated within the executable program in the controller.

Although programmable logic controllers may be programmed in a variety of programming languages many control engineers use relay ladder logic when writing application programs. In the past, relay ladder logic program editing was restricted in that only one rung of a program could be edited at any one time. Once an operator changed a rung (i.e. an individual edit) it was required that the edit be downloaded to the controller or canceled before further edits were allowed. In part the above-mentioned limitation was due to the operating system employed at the workstation. Additionally, however, when multiple edits are permitted at the workstation the operator must be able to distinguish between edited program segments which have been made at the workstation but have not been compiled and downloaded to controller and edits which have been made at the workstation and have been compiled and downloaded to the controller Furthermore, the operator must be able to distinguish between down loaded edits which are part of the program executing in the controller's processor and those which are not.

Accordingly, in view of the present state of the art, there is a present need for a method for visually displaying to an operator the difference between edited program segments which have been compiled and downloaded to a remote processor an d program segments which have been edited at the workstation but which have not yet been compiled or downloaded to the remote processor. Additionally, there is a need for a new method for displaying program edits which permits an operator to distinguish between downloaded edited program segments which are executing in the remote processor from those which are not.

SUMMARY OF THE INVENTION

The present invention solves the problems of displaying the status of edited program segments in a workstation and a remote processor when a plurality of edits are performed. In particular the present invention is directed at a method for distinguishing between inserted, replaced or deleted program segments which exist only in the workstation and those which have been downloaded to the controller and subsequently accepted.

The method for visually displaying the status of edits utilizes a plurality of visual indicia proximal the portions of edited program segments. In particular, rungs which have not been edited and are currently part of the program being executed in the programmable logic controller's processor are represented with solid power rails while rungs which are not currently executing in the controller are dotted. Alternately, edited rungs which have either been inserted, replaced, or deleted are noted as such by I, R and D indicia proximal the power rail of the rung. Additionally, an asterisk symbol (*) is used to visually identify rungs that have been modified at the workstation but which have not yet been downloaded to the controller.

Other visual indicia identify to a workstation operator program segments which have been verified. Verification implies that the operators and operands of a particular program segment have been syntactically checked and comply with a predefined format. Although verification is not a required step in the visual display process it is recommended before downloading edited program segments from the workstation to the controller to avoid syntactic type errors. The program segments are further visually identifiable as downloaded to the controller by (whether executing or not) a plurality of I, R or D indicia proximal the inserted, replaced or deleted segments, respectively. Additionally, in the event the operator deletes a program segment which has previously been downloaded to the controller but not accepted, the program segment is visually represented with small "d" indicia which conveys to the operator that the program segment will be deleted at the next download.

When the controller is in a test edits mode edited program segments which have been downloaded are immediately resolved into the program executing in the processor. In this mode the state of the program in the controller prior to entering the test edits mode is also maintained but is not executed. In accordance with the present invention, when the controller is in the test edits mode inserted program segments are visually represented with a solid power rail thereby visually indicating they are currently part of the program being executed by the controller's processor. Conversely, replaced and deleted program segments are visually represented with dotted power rails as they are no longer part of the program being executed by the controller's processor.

After testing, an operator may return the controller to its untest edits or normal mode. In the untest edits mode the program segments will revert to their previous visual state. Alternately, the operator may accept the edits during the test edits mode at which time the program segments which may be rungs are individually represented as solid lines with no other indicia.

It is therefore an object of the present invention to provide a method for visually distinguishing among a plurality of program segments those segments which have been inserted, modified and deleted from unedited program segments in both a workstation and a remote processor.

It is a further object of the present invention to provide a method for visually distinguishing between edited program segments which have not been downloaded to a remote processor from those that have been downloaded to the remote processor.

It is yet another object of the present invention to provide a method for visually distinguishing between edited program segments which have been edited at a workstation subsequent to a download to the remote processor from program segments which have been edited prior to a download.

It is still another object of the present invention to provide a method for visually distinguishing between inserted, modified and deleted program segments which have been downloaded and incorporated within the executable code running in a remote processor from program segments which have only been downloaded to the remote processor.

It is yet still another object of the present invention to provide a method for visually distinguishing between a workstation view and a remote processor view of a control program having a plurality of program edits.

It is yet another object of the present invention to provide a method for distinguishing between a plurality of program edits which have been verified from those which have not.

BRIEF DESCRIPTION OF THE DRAWINGS

FIG. 5 (b) depicts the visual display of the sample routine with an edit comprising an inserted rung in accordance with the preferred embodiment of the present invention.

FIG. 5 (c) depicts the visual display of the sample routine with an edit comprising a modification of the inserted rung in accordance with the preferred embodiment of the present invention.

FIG. 5 (d) depicts the visual display of the sample routine with a further edit comprising a deletion of an existing rung in accordance with the preferred embodiment of the present invention.

FIG. 5 (e) depicts the visual display of the sample routine with a further edit comprising a modification of an existing rung in accordance with the preferred embodiment of the present invention.

FIG. 5 (f) depicts the visual display of the sample routine as shown in FIG. 5 (e) wherein the edits have been verified in accordance with the preferred embodiment of the present invention.

FIG. 5 (g) depicts the visual display of the sample routine as shown in FIG. 5 (f) wherein the edits have subsequently been compiled and downloaded in accordance with the preferred embodiment of the present invention.

FIG. 5 (h) depicts the visual display of the sample routine as shown in FIG. 5 (g) wherein the controller's processor is in the test edits mode.

FIG. 5 (i) depicts the visual display of the sample routine as shown in FIG. 5 (h) comprising further edits of certain compiled and downloaded edits.

FIG. 5 (j) depicts the visual display of the sample routine of FIG. 5 (i) comprising further edits of certain compiled and downloaded edits in accordance with the preferred embodiment of the present invention.

FIG. 5 (k) depicts the visual display of the sample routine of FIG. 5 (j) upon a subsequent download in accordance with the preferred embodiment of the present invention.

FIG. 5 (l) depicts the visual display of the sample routine of FIG. 5 (k) when the remote processor is in the test edits mode in accordance with the preferred embodiment of the present invention.

FIG. 5 (m) depicts the visual display of the sample routine of FIG. 5 (k) upon acceptance of the edits downloaded in accordance with the preferred embodiment of the present invention.

FIG. 6 (b) depicts the visual display of the second sample routine wherein several undownloaded insert edits have been deleted.

FIG. 6 (c) depicts the visual display of the second sample routine wherein several downloaded insert edits have been deleted.

FIG. 6 (d) depicts the visual display of the second sample routine of FIG. 6 (c) upon a subsequent download in accordance with the preferred embodiment of the present invention.

DESCRIPTION OF THE PREFERRED EMBODIMENT

Figure 1:
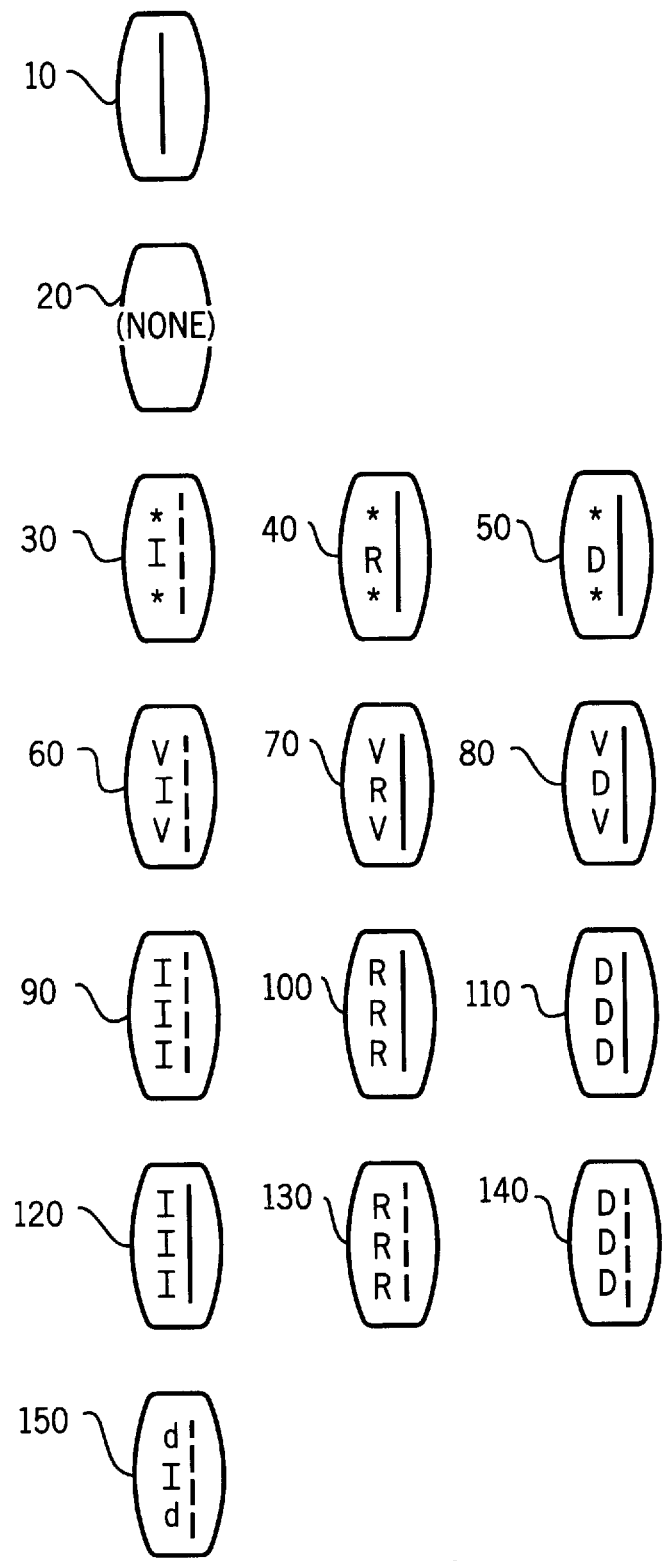
FIG. 1 depicts a state diagram of relay ladder logic rungs in accordance with the preferred embodiment of the present invention.

The present invention is disclosed in terms of editing a program written in relay ladder logic which is but one of several programming languages employed by control engineers in a factory automation environment. Accordingly, the present invention is not intended to be limited to programs written in relay ladder logic.

The preferred embodiment is directed at a method for visually distinguishing between inserted, modified or deleted program segments which have been entered at a workstation but not downloaded to a remote processor from those that have been downloaded to the remote processor and accepted. In particular, with reference to FIG. 1 there is shown a state diagram illustrating the visual differences associated with relay ladder rungs as they may exist in their several states. For the purposes of this specification, the term rung is generally used to refer to the power rail of the rung, however, it may refer to an entire rung including its operators and operands. With reference to the rungs shown in FIG. 1 individually, rung 10 is illustrative of a rung that has not been edited and is currently part of the program being executed in the programmable logic controllers processor. Rung 20 illustrates a position in the program where no rung currently exists and is generally referenced at the beginning of an insert rung edit sequence or at the end of a delete rung edit sequence. Rungs 30–50 illustrate rungs which have been inserted, replaced or deleted as is noted by the I, R and D indicia respectively. Importantly, the asterisk symbol (*) indicates that rungs 30–50 have been edited at the workstation but the edits have not been downloaded to the controller. Additionally, the power rail of rung 30 is dotted while the power rails of rungs 40 and 50 are solid. The dotted power rail of rung 30 illustrates that the rung, which is tentatively going to be inserted, will not be executing when it is downloaded to the controller and the solid power rails of rungs 40 and 50, which are tentatively going to be replaced or deleted, are currently part of the program executing in the controller.

Rungs 60–80 illustrate the visual notation that rungs 30–50 have been verified at the workstation as shown by the small "v" indicia. Verification implies that the operators and operands of a particular rung have been syntactically checked and comply with a predefined format. Although verification is not a required step in the visual display process it is recommended before downloading edits from the workstation to the controller to avoid syntactic type errors.

Rungs 90–110 are illustrative of either rungs 30–50 or 60–80 which have been downloaded to the controller while the controller is in a untested run mode. As shown, the rungs are generally visually identifiable as downloaded to the controller by more than one I, R, or D proximal the inserted, replaced or deleted rungs, respectively. Importantly, this is generally the point at which the operator has her last opportunity to cancel the edits before they are implemented within the executable program the controller is running.

Alternately, the controller may be in a test edits mode wherein downloaded edits are immediately resolved into the program executing in the remote processor. In this mode the state of the program in the controller prior to downloading the edits is also maintained but is not executed. Rungs 120–140 illustrate downloaded rungs when the controller is in the test edits mode. As shown, the inserted rung 120 is represented as a solid line indicating it is currently part of the executing program in the controller. Conversely, replaced rung 130 and deleted rung 140 are represented in dotted lines as they are no longer part of the executing program in the controller. Additionally, in the event the operator deletes a rung which has been downloaded to the controller, the rung is represented as rung 150 having small d indicia which visually informs the operator that rung will be deleted at the next download.

After testing, and operator may return the controller to its untest edits mode. In such a case, rungs 120–140 are then be represented as rungs 90–110, respectively. Alternately, the operator may accept the edits while in the test edits mode at which time rungs 90–110 are individually represented as rungs with no edits as shown in rung 10.

Figure 2:
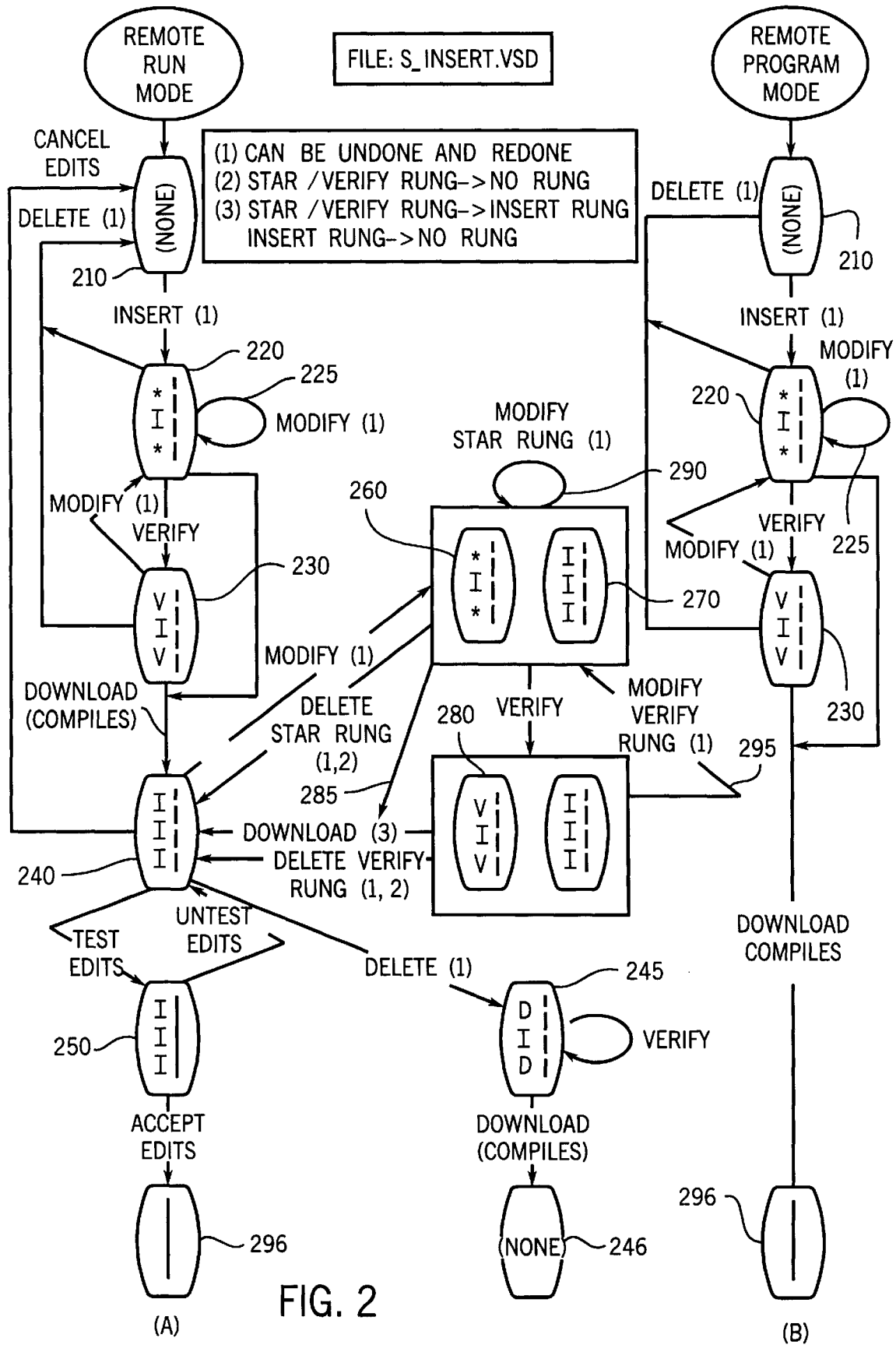
FIGS. 2(a) and 2(b) depicts the visual display elements indicative of an insert rung operation in accordance with the preferred embodiment of the present invention when the controller is in the remote run mode.

With reference to FIG. 2 there is shown a sequence of steps a workstation operator may go through when inserting a new relay ladder logic rung into an existing program. Correspondingly, the visual representations discussed above are shown at each of the possible stages of the insert editing process as it may occur both when the controller is in the remote run mode (FIG. 5 (a)) and the remote program mode (FIG. 5 (b)). As indicated by reference numeral 210 prior to the insertion of a new rung the rung does not exist and thus for the purposes of this description is visually represented as (none). However, at a program position selected by the operator a rung 220 may be inserted. As shown, rung 220 is highlighted with asterisks and is dotted to visually indicate that the inserted rung has not been downloaded to the controller and is not part of the program executing in the controller. Arrow 225 further illustrates that the inserted rung 220 may be further modified through several iterations of the editing process prior to downloading the rung to the controller. Once the insert rung 220 has been edited, the operator may select to verify the program including all edits since the previous download to determine if the program contains any syntactical errors. Upon a successful verification the inserted rungs 220 will further include a "v" indicia as shown in rung 230 indicating successful verification to the operator. Thereafter, the operator may delete the inserted rung 230 thereby reverting to representation 210. Alternately, the operator may further modify rung 230 which will immediately cause the power rail of the rung to revert to the visual representation shown by rung 220.

After verification, the operator may compile and download the rung 230 to the controller. Alternately, the operator may bypass the verification step. In either case, once an insert rung is compiled and downloaded to the controller it is visually changed. As shown in FIG. 1, downloaded insert rungs are represented by a plurality of capital I's as shown in rungs 240 and 250, however the power rail of the rung may be dotted or dashed depending upon the mode of the controller. More specifically, as shown in rung 240 the power rail is dotted indicating the rung is not being executed as part of the program in the controller's processor when the controller is in the untest edits mode. When the controller is in the test edits mode the power rail of rung 250 is solid which indicates the rung is executing during each program scan. Importantly, an inserted rung may be canceled or further modified after it is downloaded to the processor or alternately accepted as shown in FIG. 2. When the rung is downloaded but is not implemented within the executing program, i.e. rung 240, further modifications are visually represented to the operator as two rungs 260 and 270. Rung 260 is visually distinguished in the same manner as rung 220, however the corresponding rung 240 which is being modified is also shown. In this manner the operator will maintain a workstation view of the rung 240 in the controller (i.e. rung 270) as well as the proposed modifications in rung 260 at the workstation. Similar to rung 220, rung 260 may be verified and be visually represented as rung 280, or the rung 260 may be directly downloaded to the controller without verification as indicated by arrow 285. When either the rung 260 or the rung 280 are downloaded to the controller it will replace rung 240. Of course, rungs 260 or 280 may be further modified as indicated by arrows 290 and 295, respectively, prior to a download. In the case where rung 280 is modified by the operator it will revert to the visual representation as shown in rung 260 as the modifications have not been verified.

When the rung 240 is accepted it becomes part of the executable code of the program running in the controller and is no longer represented as an edit. More specifically, after acceptance of rung 250 it is visually represented as rung 296 which is a representation of an unedited rung. Alternately, when the controller is in the untest edits mode and an operator elects to delete a rung 240 which has not been accepted the rung is visually represented as rung 245. Accordingly, when the next download occurs rung 245 is deleted and may be represented as rung 246.

FIG. 2 (b) illustrates the visual display of an inserted rung when the controller is in the remote program mode. In the remote run mode the controller is off-line, meaning that the control program is not running and essentially, inserted rungs are visually displayed in the same manner as when the controller is in the remote run mode. However, since the controller is off-line downloaded rungs are inserted directly into the controller's executable program without the option to test the inserted rung. Accordingly, modification of downloaded rungs is not required and therefore not visually represented.

Figure 3A:
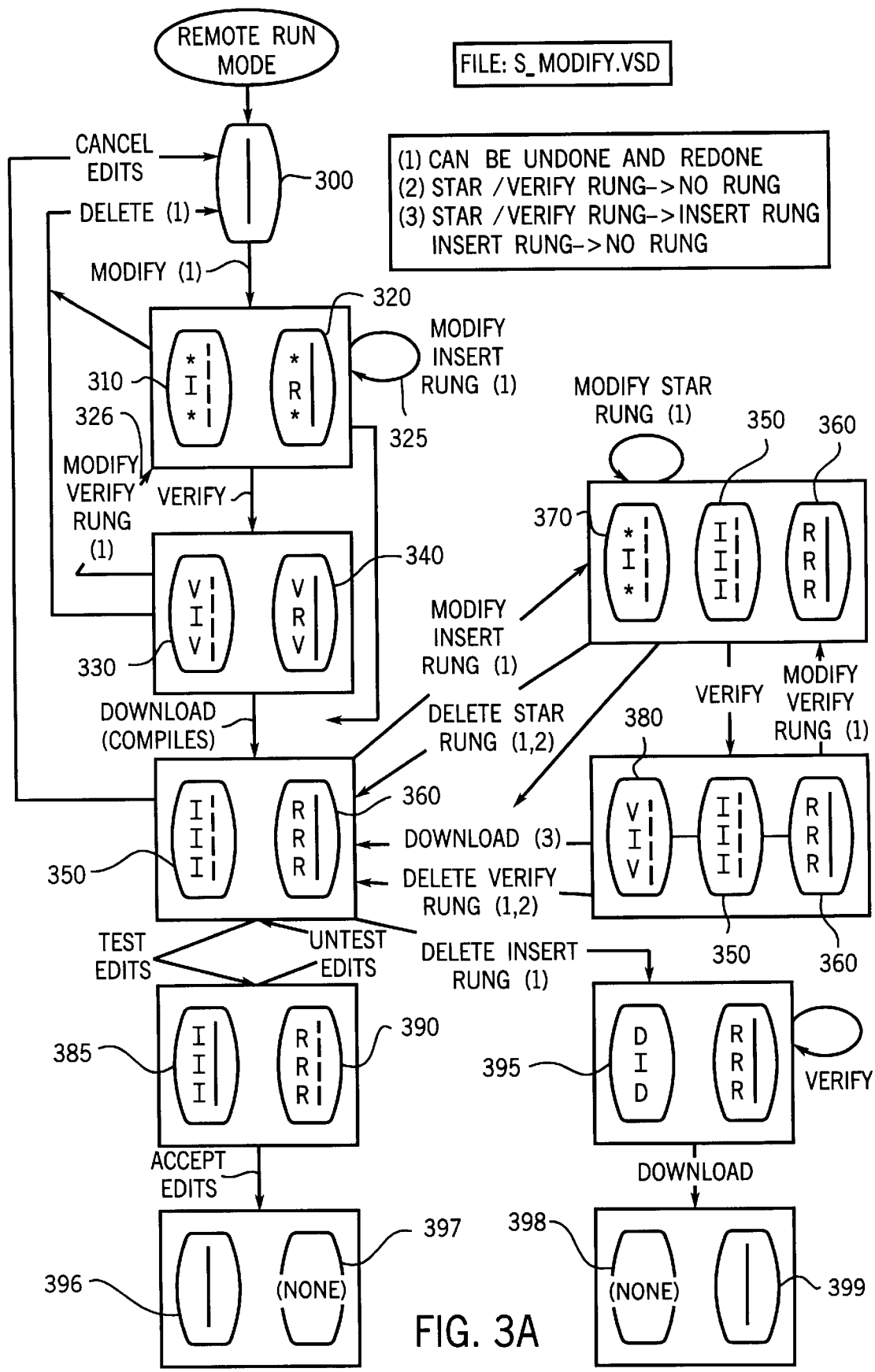
FIGS. 3(a) and 3(b) depicts the visual display elements indicative of a modify rung operation in accordance with the preferred embodiment of the present invention.

With reference to FIG. 3 (a) there is shown the visual display elements employed when implementing a program edit that modifies an existing rung 300 executing in the controller when the controller is in the remote run mode. In general, modification to existing rungs are represented by "IR" rung pairs (i.e. an inserted "I" rung and a replaced "R" rung). For example, when the rung 300 is selected by an operator to be modified. Rungs 310 and 320 represent the "IR" pair, respectively. More specifically, rung 310 is represented by dotted lines since it is not executing in the controller, visually represents the rung 300 with the proposed modifications. On the other hand, rung 320 which is depicted in a solid line, since it is presently part of the program being executed by the controller, represents the rung 300 before any modifications. Rung 320 is further visually depicted with an "R" indicia indicating that it will be replaced on the next download. Similar to the insert edit routine mentioned above, modified rungs may be verified, at the request of the workstation operator, to determine whether the rung 310 contains any syntactic errors. As above, when the operator selects to verify edits and such verification is completed, inserted rung 310 is modified to contain small "v" indicia as shown by rung 330. However, although shown, replaced rung 340 need not contain any "v" indicia since it will ultimately be replaced on the next download.

Similar to the insert type edit described in reference to FIGS. 1 (a) and (b) rung 310 and 330 may be further modified through several iterations generally represented by arrows 325 and 326. As before, when a previously verified rung 330 is further modified it loses its small "v" indicia since the modifications have not been syntactically checked. When the operator has sufficiently edited rung 310 he may choose to download IR pair 310, 320 or IR pair 330, 340 (if the rungs were verified) to the controller. Upon a successful download, the rungs downloaded will be visually represented with a plurality of "I's" or a plurality of "R's" as shown in rungs 350 and 360, respectively. Further modifications to downloaded rungs 350 results in the visual display of rungs 370, 350 and 360. In particular, insert rung 370 is the proposed modification to rung 350 and has not been downloaded to the controller and therefore is represented with a dotted power rail with the asterisk indicia indicating that the rung exists only in the workstation. Similar to rung 310, rung 370 may be verified by the operator at which time its visual representation will change to that shown by rung 380. Alternately, the verification step may be neglected. However, at the next download either rung 370 or 380 will replace rung 350 in the controller.

As described in the insert rung edit routine above, the controller can be toggled between a test edits mode and an untest edits mode. When in the test edits mode the power rail of rung 350 becomes solid as depicted by rung 385 and the power rail of rung 360 becomes dotted as depicted by rung 390 which visually indicates that the inserted rung 350 is now part of the executable program and rung 360 is not. If the edits prove unsatisfactory, the operator can revert to the untest edits mode and delete the inserted rung 350. When deleted, rung 350 will be visually changed to appear as rung 395 having small "d" indicia. Which visually represents that the rung 350 (now represented as rung 395) will be deleted in the controller when the next download is initiated by the operator as indicated by rung location 398. Correspondingly, the previously replaced rung 360 will no longer be replaced and thus the power rail reverts back to that of an unedited rung as shown in rung 399.

Figure 3B:
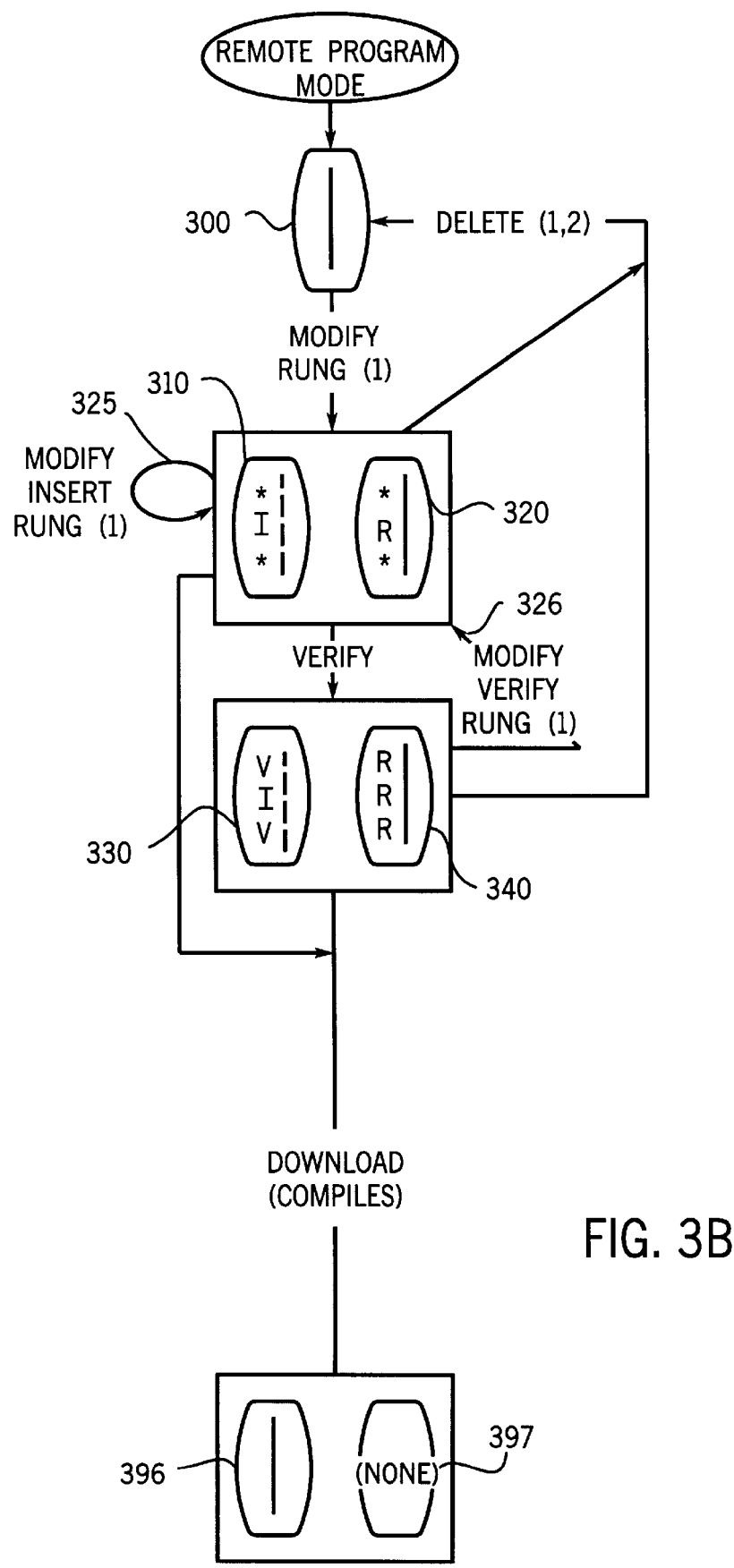

The visual display elements of the modify edit routine when the controller is in the remote program mode are similar to that shown in the remote run mode. In particular, when the controller is in the remote program mode the program stored in the controller is not executing. Accordingly, distinguishing between edits that are executing in the controller's processor from those that have been downloaded and are not executing is not required. As such, the visual display elements shown in FIG. 3(b) are identical to those shown in FIG. 3(a) except that the visual display of edited downloaded rungs is not shown since they are not permitted.

Figure 4:
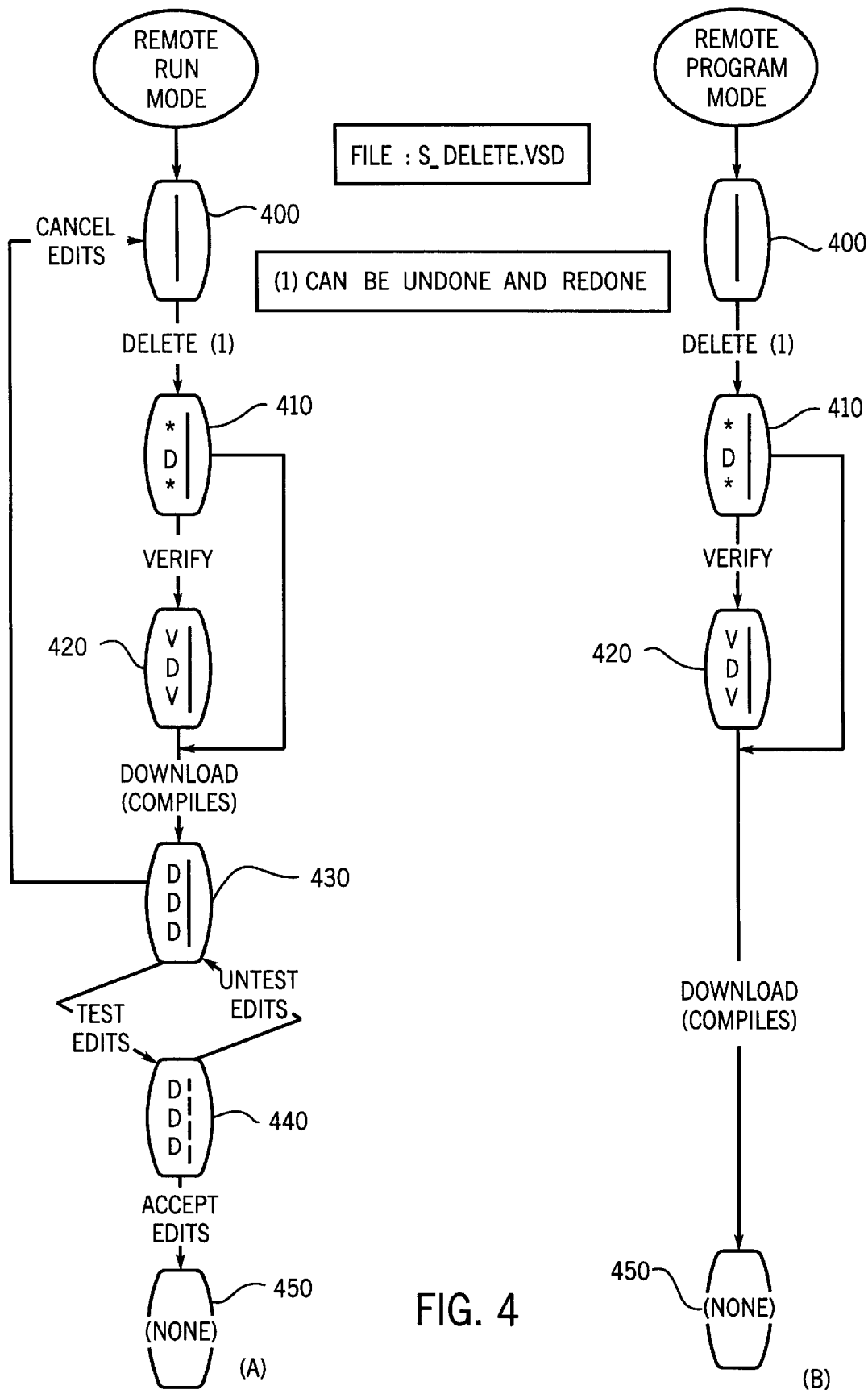
FIG. 4(a) and (b) depicts the visual display elements indicative of a delete rung operation in accordance with the preferred embodiment of the present invention.

With respect to FIG. 4(a) there is shown the visual display elements associated with deleting a rung when the controller is in the remote run mode. In particular, rung 400 has a solid power rail indicating that it is currently part of the program executing in the controller. When the operator selects to delete rung 400 it is visually transformed to the representation shown in rung 410. Specifically, a "D" and asterisk indicia are placed proximal the rung to indicate that the rung will be deleted in the controller on the next download and that the delete edit is only present in the workstation, respectively. Similar to the edit sequences discussed above rungs which have been selected for deletion may be verified as shown by rung 420. Alternately, the delete edit may be downloaded directly to the controller as indicated in rung 430. Once downloaded, the rung is visually represented with a plurality of capital "D's" indicating the compile and download has occurred. Thereafter, the operator may place the controller in the test edits mode at which time the power rail of the downloaded rung 430 will change from solid to dotted (i.e. rung 440) indicating that the program being executed by the controller no longer includes rung 440. Upon a successful test, the operator may accept the delete edit at which time the visual representation of the rung will be deleted from the operator's view at the workstation as indicated by rung 450. As before, the controller may be in a remote program mode whereby delete type edits would be implemented in the same manner as they would be in the remote run mode, however, the possibility to further edit a downloaded rung is not possible. More specifically, a downloaded rung becomes part of the controller's executable program without the further ability to test or delete edits.

Figure 5A:
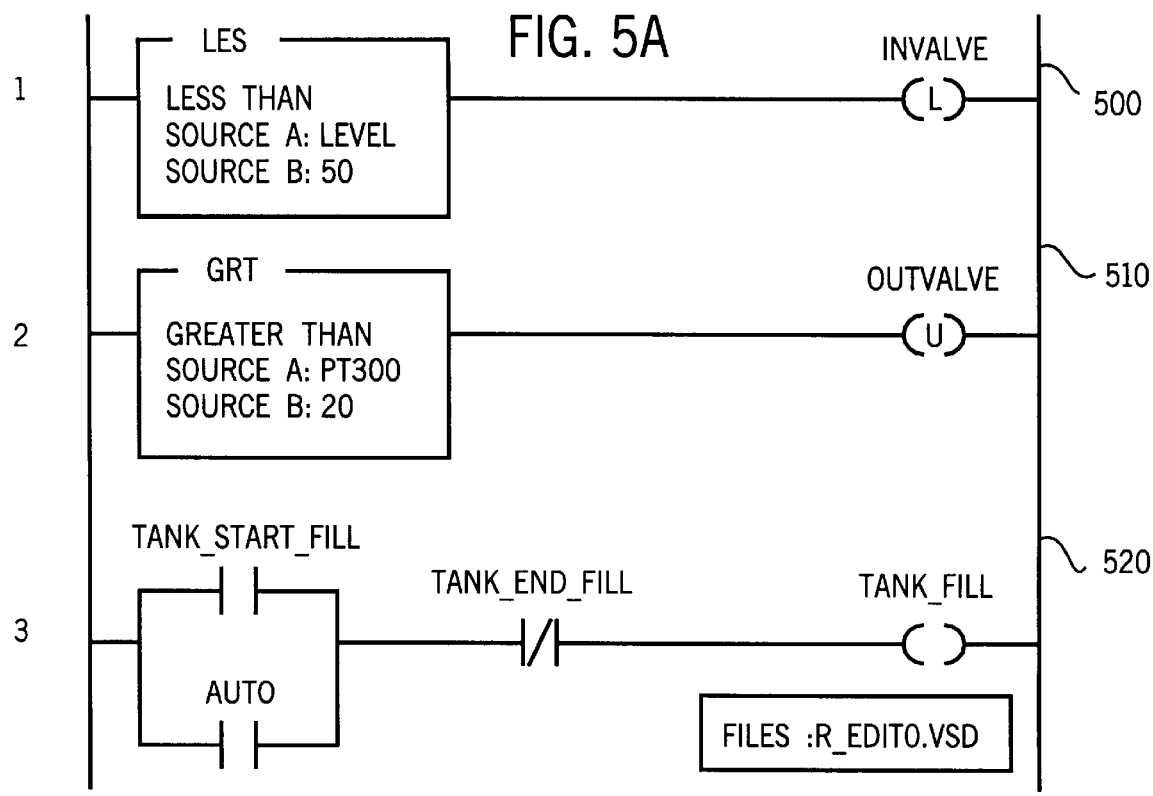
FIG. 5 (a) depicts the visual display of a sample relay ladder logic routine prior to any edits in accordance with the preferred embodiment of the present invention.
Figure 5B:
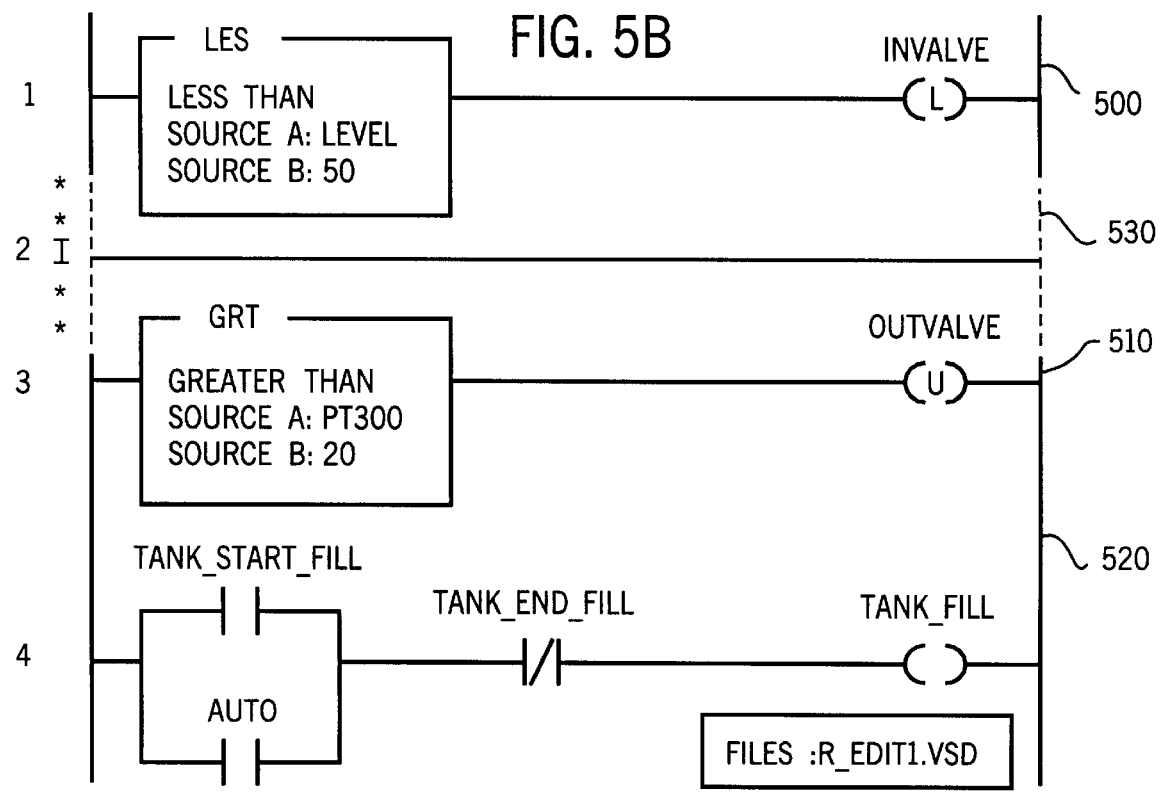

With respect to FIG. 5(a) there is shown a visual representation of a typical relay ladder logic program for the purpose of demonstrating an edit session implementing the method of visually displaying edits of the present invention. The example supposes the edits are being implemented by an operator at a workstation when the controller is in the remote run mode. Specifically, FIG. 5(a) represents the visual display of a three rung relay ladder logic program 500 (i.e. rungs 510–520) prior to any edits. Importantly, all of the power rails of the rungs are denominated by solid lines indicating that they are part of the executable code presently being executed by the controller during each program scan. During the first edit step, the operator implements an insert rung edit at a selected portion within the program thereby inserting new rung 530 to yield the representation as shown in FIG. 5(b). Through several modifications the operator may add instructions and modify the operators and operands associated with the newly inserted rung 530 to yield the visual representation shown in FIG. 5(c). However, in accordance with the present invention the power rail of the inserted rung 530 remains dotted with the "I" and asterisk indicia to visually display that rung is an inserted rung that exists only in the workstation and is not part of the executable program in the controller. At the next edit step, FIG. 5(d), the operator elects to delete rung 510. Accordingly, the visual display of rung 510 comprises the "D" and asterisk indicia thereby visually indicating the rung has been selected for deletion on the next accepted download to the controller and further that the edit has not been downloaded to the controller.

Figure 5D:
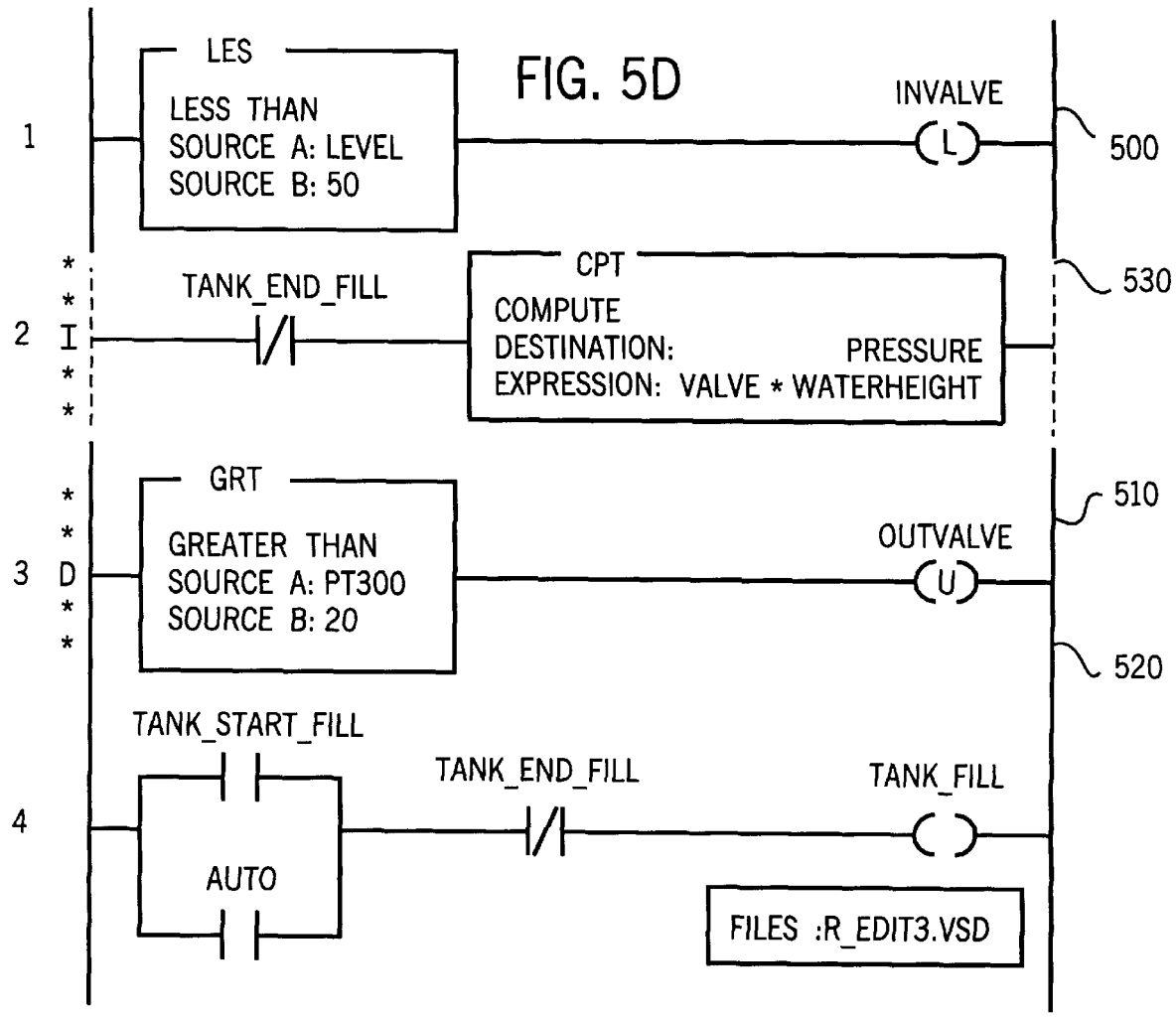

With respect to FIG. 5(e) the workstation operator has selected to modify an existing rung 520 as displayed in FIG. 5(d). In accordance with the present invention the modification edit results in the visual display of an "IR" pair (i.e. rungs 540 and 520) which are proximal one another in the visual display of the program. As shown, the "I" or insert rung 540 comprises an additional compare instruction not found in the corresponding "R" rung 520. More importantly, however, both the "I" rung 540 and the "R" rung 520 are highlighted with asterisks which indicate that those edits only exist in the workstation (i.e. they have not been downloaded). Additionally, the power rail of the "R" rung 520 is solid while the power rail of the "I" rung 510 is dotted thereby visually indicating that the "R" rung is presently part of the executable code in the controller while the "I" rung is not.

FIG. 5(f) depicts the visual display of the edits after the operator has successfully verified the edits. Since no syntactical errors are present all of the edited rungs are verified as indicated by the "v" indicia.

Figure 5G:
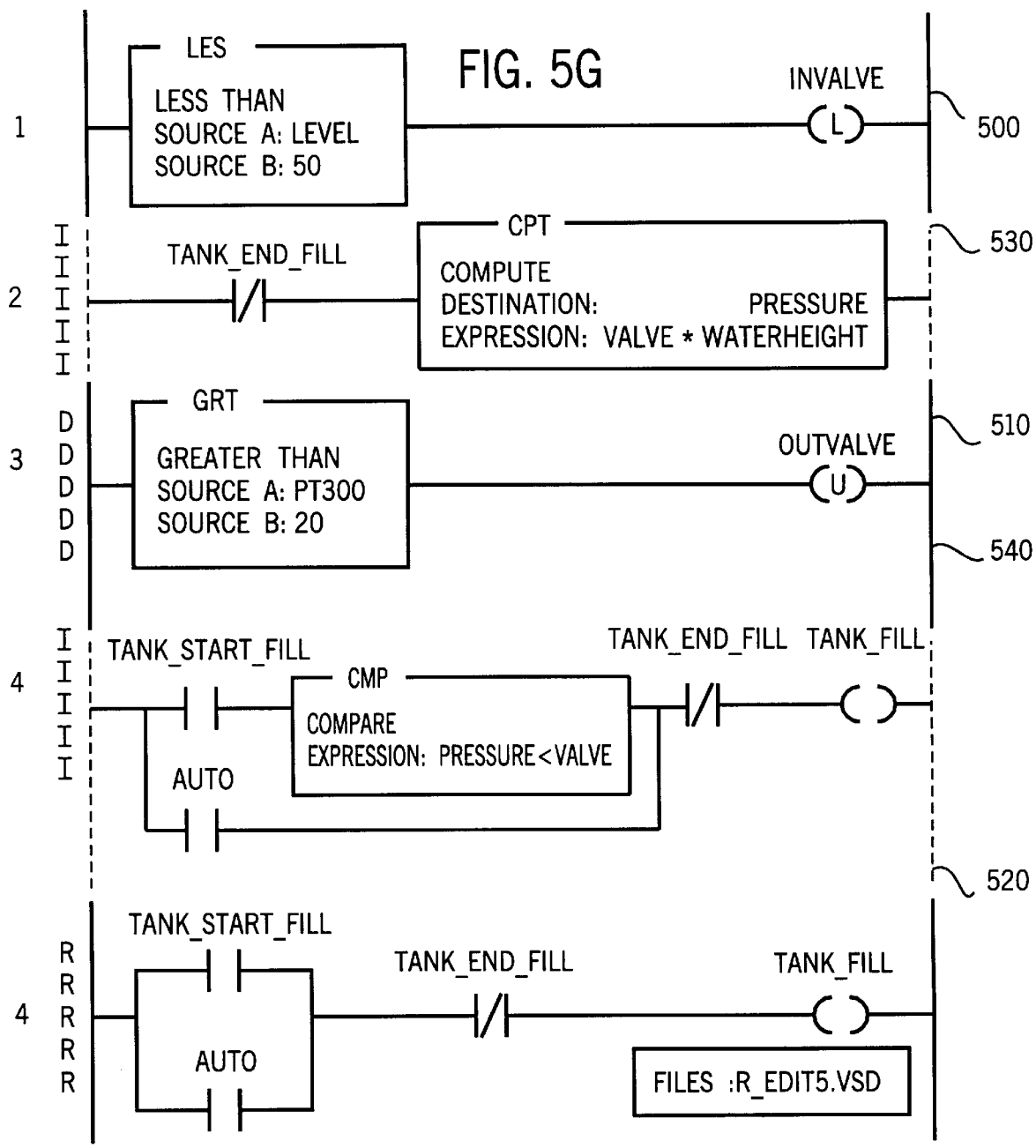

Once the workstation operator has finished editing he may download the edited rungs to the controller's processor. Downloading edits entails compiling the code and transmitting the compiled code from the workstation to the controller. After a successful download has occurred the visual display of the edits is updated to indicate that the edits have been successfully downloaded. With reference to FIG. 5(g), the edited rungs which have been downloaded are visually modified such that the inserted, replaced or deleted rungs are now highlighted by a plurality of "I", "R" or "D" indicia proximal the rungs, respectively. Since the controller is in the remote run mode in this example the downloaded edits are not immediately effective as part of the executable code in the controller's processor. Rather, only when the controller is set to the test edits mode (FIG. 5(h)) are the inserted rungs 530 and 540 implemented within the executable code of the controller as indicated by their solid power rails. Similarly, when in the test edits mode deleted rung 510 and replaced rung 520 are dotted indicating that they are no longer part of the executable code in the controller.

Figure 5J:
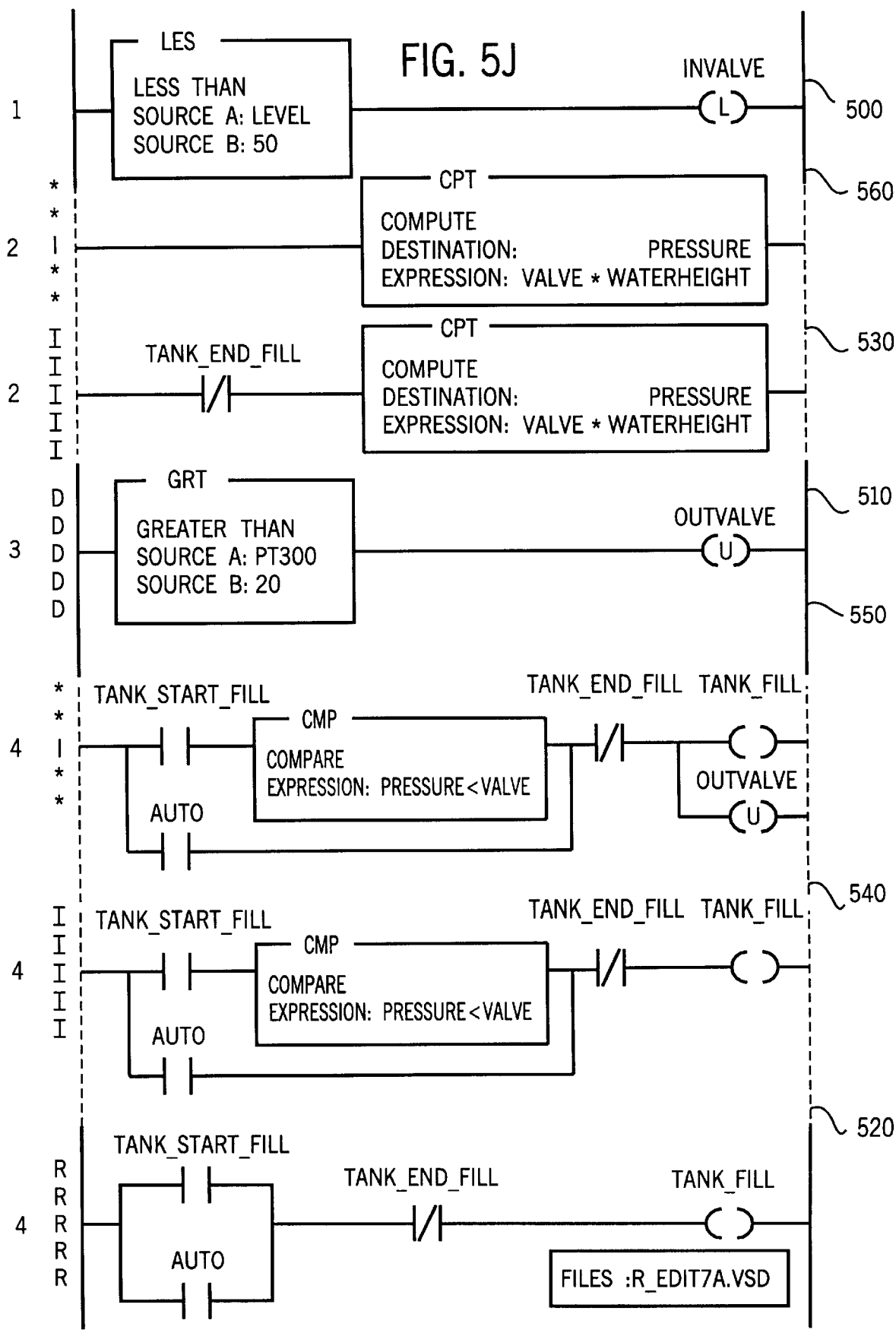
Figure 5K:
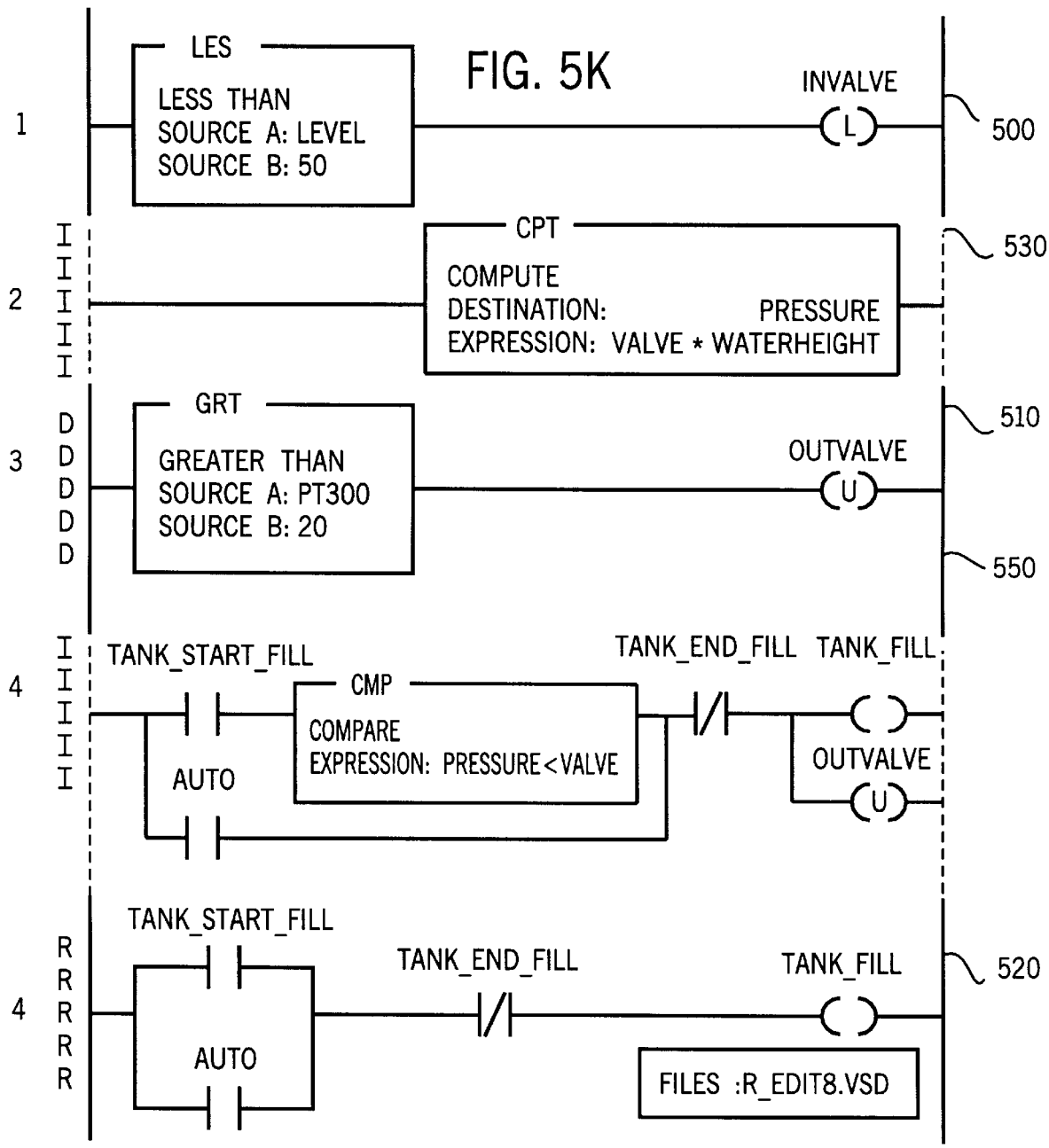
Figure 5M:
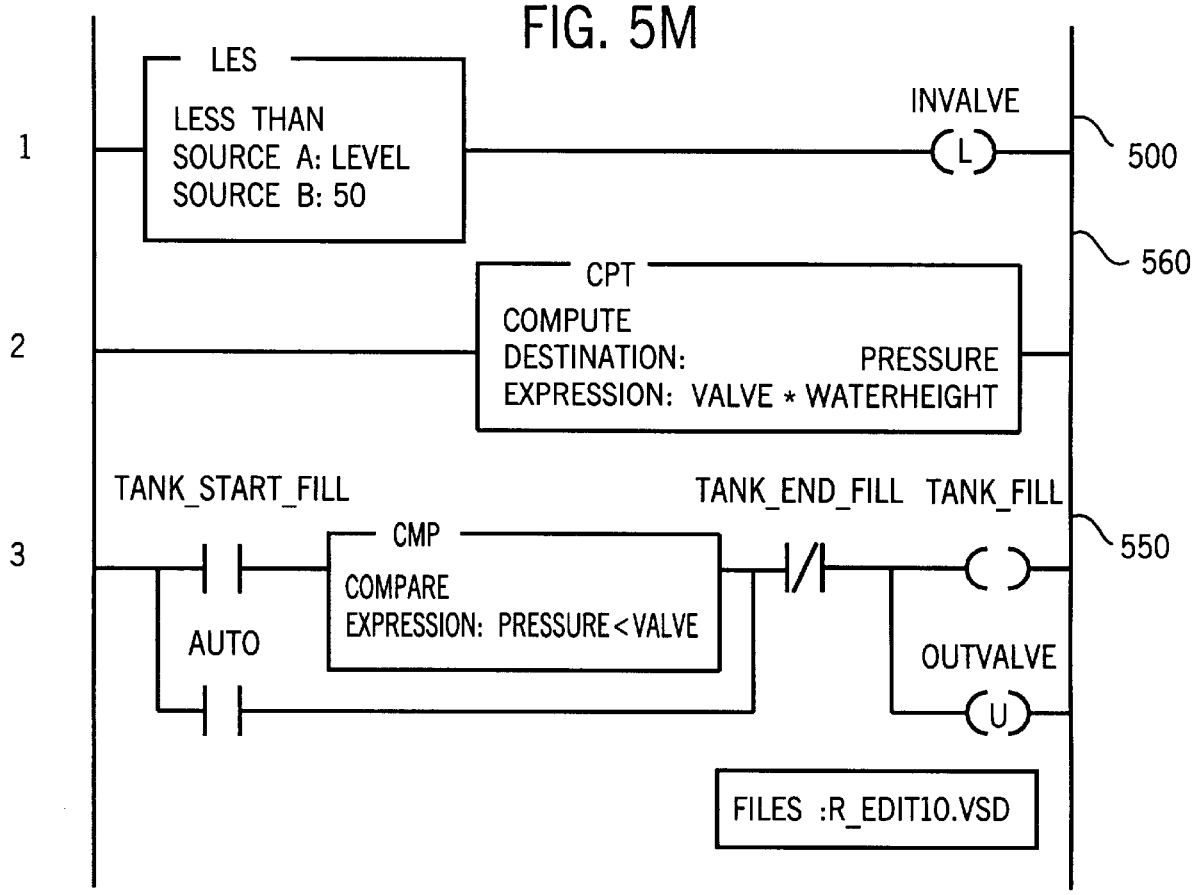

FIG. 5(i) illustrates the visual display when the workstation operator modifies the inserted rung 540 after it has been downloaded to the controller. In particular, the edit is visually displayed in accordance with FIG. 3(a) rungs 350–370. Importantly, the modification of the downloaded inserted rung 540 is now shown as three rungs proximal one another. The first rung 550 represents the modified rung which exists only in the workstation as indicated by the asterisk indicia while the "IR" pair comprising rungs 540 and 520 represent the previously downloaded rungs shown in FIG. 5(h). Additionally, as shown in FIG. 5(j), the operator has further selected to modify downloaded insert rung 530. As a result the edit is visually represented proximal by rungs 560 and 530 wherein rung 560 depicts the further edit to rung 530 and exists only in the workstation, while rung 530 shows the operator what is in the controller. At the next download, FIG. 5(k), the visual display is updated such that insert rung 540 is visually removed and the modified insert rung 550 is highlighted with a plurality of "I" indicia showing it has been downloaded. Similarly rung 530 is visually removed while rung 560 is highlighted with a plurality of "I" indicia. Finally, after successfully testing the modified edits as shown in FIG. 5(i), the operator may select to accept the edits in which case the visual display is further updated as shown in FIG. 5(m). Specifically, deleted rung 540 and replaced rung 520 have been deleted from the visual display and the "I" indicia has been removed from the inserted rungs 515 and 535. Essentially, the display shown in 5(m) is the starting point for further edits.

Figure 6A:
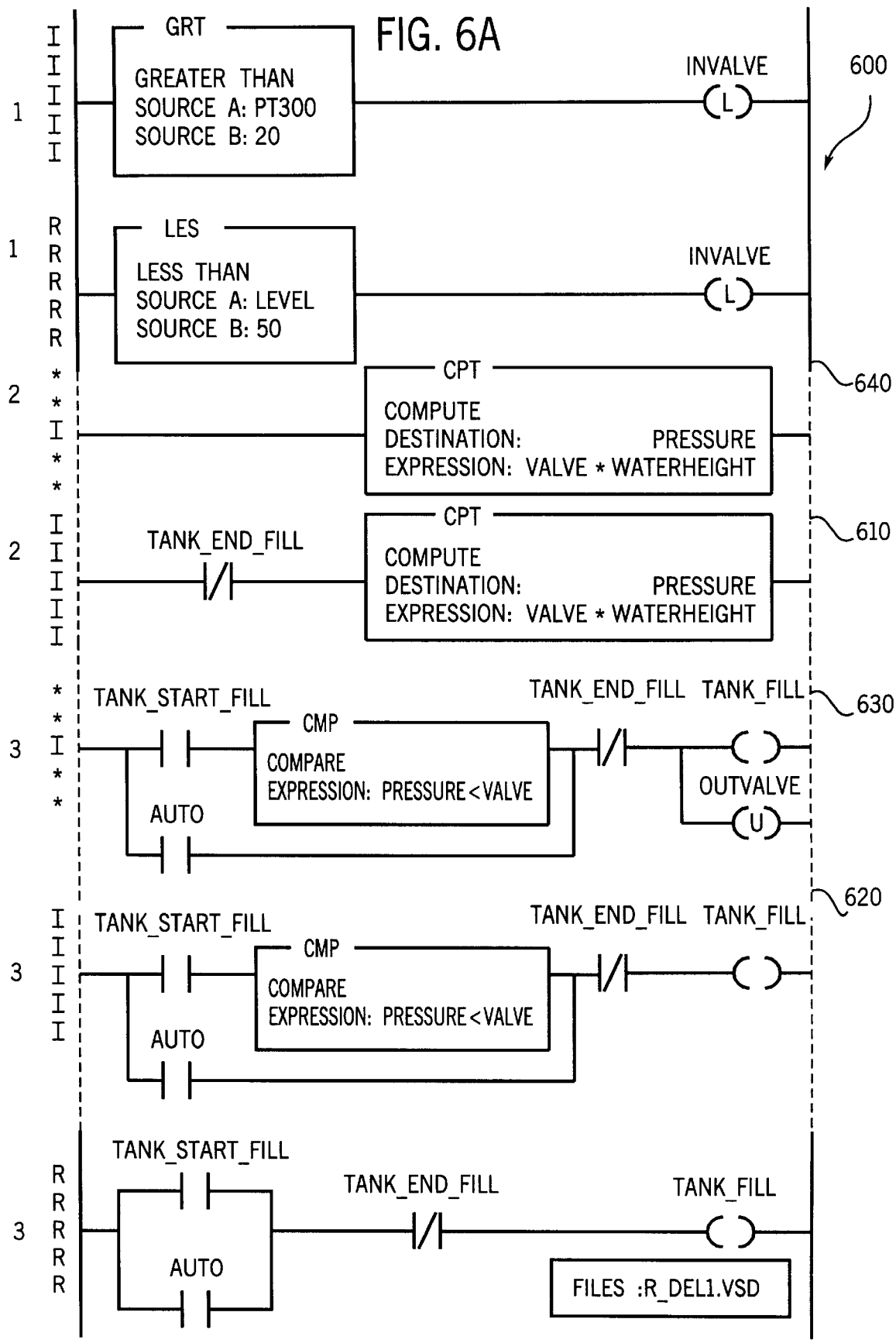
FIG. 6 (a) depicts the visual display of the second sample routine with several edits in accordance with the preferred embodiment of the present invention.
Figure 6B:
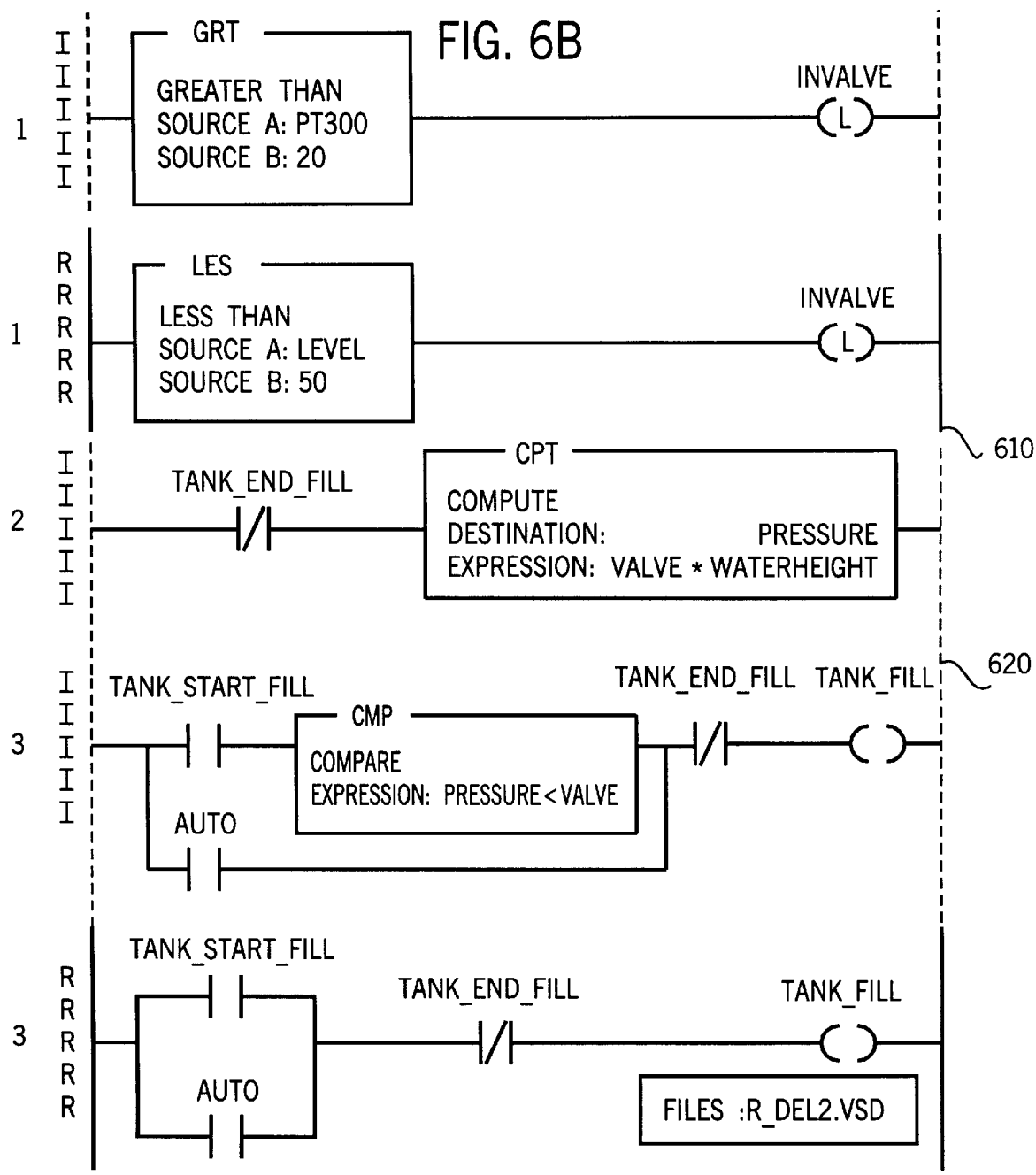
Figure 6D:
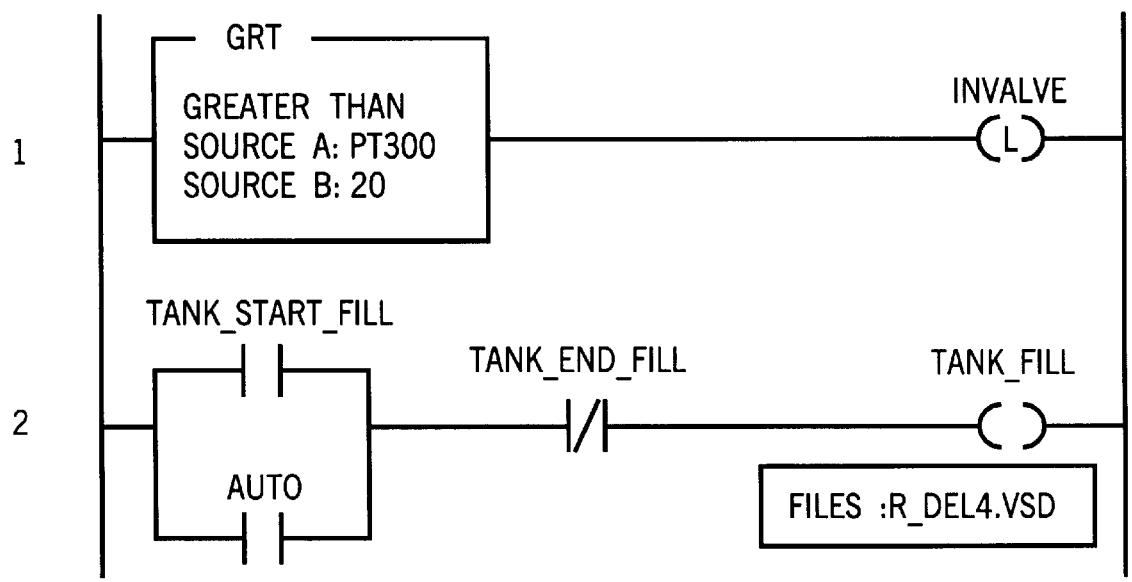

A second example of the visual display of an editing sequence is shown in FIGS. 6(a–d) particularly to illustrate the visual display associated with undownloaded and downloaded modify type edits. With reference to FIG. 6(a) there is shown a relay ladder logic routine 600 which has been modified considerably. In particular, modified rungs 610 and 620 have been downloaded to the controller and subsequently modified but not downloaded as visually illustrated by proximal rungs 630 and 640 in accordance with the previously disclosed preferred embodiment of the present invention. FIG. 6(b) illustrates the visual result if the operator selects to delete the undownloaded edits. Simply, rungs 630 and 640 are removed from the visual display of the routine 600 as shown in FIG. 6(b). Moreover, rungs 630 and 640 have not been downloaded there is no further need to visually display those rungs. On the other hand, if the rungs were already downloaded to the controller (i.e. rungs 610 and 620) visual deletion of the rungs from the routine prior to a download would prevent the operator from seeing the executable program as it exists in the controller. Accordingly, as shown in FIG. 6(c) downloaded insert type edits which have been selected for deletion are visually signified by a "d" type indicia in addition to the "I" indicia as shown by rungs 650 and 660. Visually, such indicia will enable the operator to distinguish between the insert edits that will be implemented and those that will not when the operator implements the next download and accepts the edits as shown in FIG. 6(d).

In an alternate embodiment the any of the previous visual indica may be included within the visual display of the program segments of the program. In particular, the color of edited program segments may be coded or the font of the program segments may be changed to indicate whether the segment has been downloaded to the remote processor, verified, modified after being downloaded to the remote processor, selected for deletion, part of the code executing in the remote processor or otherwise notable. Additionally, individual program segments may be surrounded by boxes and use similar dotted or solid lines as the rungs shown in the preferred embodiment. Accordingly, the visual indica of the preferred embodiment is intended as only one embodiment whereas the general method of visually distinguishing among the various states of the program segments is intended to define the inventive subject matter.

Various modifications and alterations in the described method will be apparent to those skilled in the art from the foregoing description which does not depart from the spirit of the invention. For this reason, these changes are desired to be included in the scope of the appended claims. The appended claims recite the only limitations of the present invention and the descriptive matter which is employed for setting forth the present embodiment and is to be interpreted as illustrative and not limitative.

What we claim is:

1. A method for simultaneously displaying an executable program in a remote processor and a plurality program edits input at a workstation, the executable program comprising a plurality of executable program segments, the plurality of program edits comprising new program segments and modified program segments, the executable program segments including corresponding executable program segments corresponding to the modified program segments, the plurality of program edits being selectively downloaded from the workstation to the remote processor, the method comprising the steps of:

displaying the plurality of executable program segments;

displaying new program segments at selected positions proximal the executable program segments, each new program segment including a first modifiable visual indica; and displaying each modified program segment proximal the corresponding executable program segment, each modified program segment including a second modifiable visual indica.

2. The method as set forth in claim 1 wherein the first modifiable visual indica indicates whether each new program segment has been downloaded to the remote processor.

3. The method as set forth in claim 1 wherein the first modifiable visual indica indicates whether each new program segment is executing in the remote processor.

4. The method as set forth in claim 1 wherein the second modifiable visual indica indicates whether each new program segment has been downloaded to the remote processor.

5. The method as set forth in claim 1 wherein the second modifiable visual indica indicates whether each new program segment is executing in the remote processor.

6. The method as set forth in claim 1, wherein said corresponding executable program segments include a third modifiable visual indica.

7. The method as set forth in claim 1, wherein said executable program segments, said new program segments and said modified program segments are relay ladder logic rungs.

8. A method for simultaneously displaying an executable program in a remote processor and a plurality program edits input at a workstation, the executable program comprising a plurality of executable program segments, the plurality of program edits comprising new program segments and modified program segments, the executable program segments including corresponding executable program segments corresponding to the modified program segments, the workstation coupled to the remote processor, the plurality of program edits being selectively downloaded from the workstation to the remote processor, the method comprising the steps of:

displaying the plurality of executable program segments;

displaying new program segments proximal the executable program segments, each new program segment including a first modifiable visual indica that indicates whether each new program segment has been downloaded; and displaying each modified program segment proximal the corresponding executable program segment, each modified program segment including a second modifiable visual indica that indicates whether each modified program segment has been modified.

9. The method as set forth in claim 8, wherein said executable program segments, said new program segments and said modified program segments are relay ladder logic rungs.

10. A method for simultaneously displaying the status of a program including program edits at a workstation and a remote processor, the program comprising a plurality of program segments, the method comprising the steps of:

displaying a first and second visual indica proximal a new program segment, the first visual indica indicating that the new program segment will be inserted upon a subsequent download, said second visual indica indicating said new program segments exists only in the workstation;

displaying a modified program segment as two program segments, said two program segments comprising an insert program segment and a replace program segment, the insert program segment including a third visual indica and fourth visual indica, the third visual indica indicating the insert program segment will be inserted into the program upon a subsequent download, the fourth visual indica indicating the insert program segment exists only in the workstation, the replace program segment including an fifth and sixth visual indica, the fifth visual indica indicating the replace program segment will be replaced upon a subsequent download, the sixth visual indica indicating the replace program segment is part of the executable code running in the remote processor; and displaying a seventh visual indica proximal a delete program segment indicating the delete program segment will be deleted upon a subsequent download to the remote processor.

11. The method as set forth in claim 10, wherein said executable program segments, said new program segments and said modified program segments are relay ladder logic rungs.

12. A method for simultaneously displaying the status of a program including program edits at a workstation and a remote processor, the program comprising a plurality of program segments, the method comprising the steps of:

displaying a first visual indica proximal edited program segments which have not been downloaded to the remote processor; and displaying a second visual indica proximal edited program segments which have been downloaded to the remote processor.

13. The method according to claim 12 wherein said second visual indica comprises a first type and a second type, the method further comprising:

displaying the first type proximal edited program segments which have been downloaded and are not executing in the remote processor; and displaying the second type proximal edited program segments which have been downloaded and are executing in the remote processor.

14. The method as set forth in claim 12, wherein said plurality of program segments are relay ladder logic rungs.

* * * * *